United States Patent
Gao et al.

(10) Patent No.: US 12,289,266 B2
(45) Date of Patent: Apr. 29, 2025

(54) REFERENCE SIGNAL RESOURCE CONFIGURATION METHOD AND APPARATUS

(71) Applicant: HUAWEI TECHNOLOGIES CO., LTD., Guangdong (CN)

(72) Inventors: Xin Gao, Beijing (CN); Yongping Zhang, Beijing (CN); Tie Li, Beijing (CN); Su Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 17/881,463

(22) Filed: Aug. 4, 2022

(65) Prior Publication Data

US 2022/0376865 A1    Nov. 24, 2022

Related U.S. Application Data

(63) Continuation of application No. PCT/CN2020/074459, filed on Feb. 6, 2020.

(51) Int. Cl.
*H04W 88/02*   (2009.01)
*H04L 5/00*    (2006.01)
*H04L 5/22*    (2006.01)

(52) U.S. Cl.
CPC .......... *H04L 5/0048* (2013.01); *H04L 5/0007* (2013.01); *H04L 5/22* (2013.01); *H04W 88/02* (2013.01)

(58) Field of Classification Search
CPC ....... H04L 5/0048; H04L 5/0007; H04L 5/22; H04W 88/02

USPC ......................................................... 370/330
See application file for complete search history.

(56) References Cited

U.S. PATENT DOCUMENTS

2013/0083683 A1 * 4/2013 Hwang ................. H04W 64/00
                                                    370/252

FOREIGN PATENT DOCUMENTS

| CN | 105589506 A | 5/2016 |
| CN | 107026724 A | 8/2017 |
| CN | 109802801 A | 5/2019 |
| CN | 110474734 A * 11/2019 | ........... H04L 5/0023 |
| EP | 3817469 A1 | 5/2021 |
| WO | 2018151554 A1 | 8/2018 |
| WO | 2018175709 A1 | 9/2018 |

(Continued)

OTHER PUBLICATIONS

Qualcomm Incorporated, "Remaining Details on UL Reference Signals for NR Positioning," 3GPP TSG RAN WG1 #98, R1-1912974, Chongqing, China, Oct. 14-18, 2019, 6 pages.

(Continued)

*Primary Examiner* — Christopher R Crompton
(74) *Attorney, Agent, or Firm* — Fish & Richardson P.C.

(57) ABSTRACT

The present disclosure relates to reference signal resource configuration methods and apparatus. In one example reference signal resource configuration method, a terminal receives sounding reference signal (SRS) resource configuration information from a base station. In response to determining that at least two SRS resources indicated by the SRS resource configuration information are located on a same orthogonal frequency division multiplexing (OFDM) symbol, the terminal maps one of the at least two SRS resources to the OFDM symbol.

16 Claims, 11 Drawing Sheets

(56) References Cited

FOREIGN PATENT DOCUMENTS

| | | | |
|---|---|---|---|
| WO | 2019214682 | A1 | 11/2019 |
| WO | 2020163597 | A1 | 8/2020 |

OTHER PUBLICATIONS

Office Action in Japanese Appln. No. 2022-547763, mailed on Aug. 29, 2023, 4 pages (with English translation).

LG Electronics, "Remaining issues on SRS," 3GPP TSG RAN WG1 Meeting #92bis, R1-1804548, Sanya, China, Apr. 16-20, 2018, 9 pages.

Sony, "Summary of SRS," 3GPP TSG RAN WG1 Meeting #94, R1-1809519, Gothenburg, Sweden, Aug. 20-24, 2018, 58 pages.

3GPP TS 38.214 V16.0.0, "3rd Generation Partnership Project; Technical Specification Group Radio Access Network; NR; Physical layer procedures for data (Release 16)," Dec. 2019, 147 pages.

Huawei et al., "On NR TTE features in Rel-16," 3GPP TSG RAN WG1 Meeting #100-e, R1-2000212, Feb. 24-Mar. 6, 2020, 18 pages.

3GPP TS 38.306 V15.8.0, "3rd Generation Partnership Project; Technical Specification Group Radio Access Network; NR; User Equipment (UE) radio access capabilities (Release 15)," Dec. 2019, 60 pages.

3GPP TS 38.331 V15.8.0, "3rd Generation Partnership Project; Technical Specification Group Radio Access Network; NR;Radio Resource Control (RRC) protocol specification (Release 15)," Dec. 2019, 532 pages.

R1-1805728, "Rel-15 NR UE feature list," Apr. 24, 2018, 30 pages.

Extended European Search Report in European Appln No. 20917703.9, dated Dec. 1, 2022, 10 pages.

International Search Report and Written Opinion in International Appln. No. PCT/CN2020/074459, mailed on Oct. 28, 2020, 20 pages (with English translation).

Action in Indian Appln. No. 202227050423, mailed on Mar. 1, 2024, 6 pages (with English translation).

* cited by examiner

REFERENCE SIGNAL RESOURCE CONFIGURATION METHOD AND APPARATUS

CROSS-REFERENCE TO RELATED APPLICATIONS

This application is a continuation of International Application No. PCT/CN2020/074459, filed on Feb. 6, 2020. The disclosure of which is hereby incorporated by reference in its entirety.

TECHNICAL FIELD

This application relates to the field of communications technologies, and in particular, to a reference signal resource configuration method and an apparatus.

BACKGROUND

A new radio (new radio, NR) technology is used for positioning, to improve positioning precision. In a positioning technology based on uplink, a terminal sends a reference signal, for example, a sounding reference signal (sounding reference signal, SRS), based on configuration by a base station. The base station measures the reference signal sent by the terminal to obtain a time of arrival or an angle of arrival of the reference signal, so as to obtain a distance and a direction between the terminal and the base station, and estimate a location of the terminal.

Currently, the SRS is used for multiple purposes, for example, beam management, codebook transmission, non-codebook transmission, and antenna switching. Now, a positioning function is added, and an SRS resource used for positioning and an SRS resource used for another purpose are separately configured. In other words, both the SRS resource used for positioning and the SRS resource used for another purpose are configured for the terminal at a same moment. The terminal needs to simultaneously send SRS resources for multiple purposes. An SRS resource configuration includes a bandwidth, a cycle, an initial value, a time-frequency position, and the like. In an example shown in FIG. 1, a cycle of an SRS resource used for non-codebook transmission and a cycle of an SRS resource used for positioning are different, and cycles of SRS resources used for positioning in different resource sets are different. For both cases, collision on a same slot may occur. However, for SRS resources that have a same cycle and that are for a same purpose, collision on a same symbol may also occur.

A concurrence of multiple SRS resources at a same moment or on a same symbol is a great challenge for a processing capability of a chip of a terminal. Total chip resources used for SRS resource processing are limited, and chip resources occupied for SRS processing vary with different purposes. For example, more resources may be occupied for processing an SRS resource used for non-codebook transmission than for processing an SRS resource used for positioning. Therefore, when total processing resources are fixed, how to appropriately configure SRS resources for multiple purposes becomes an urgent problem to be resolved.

SUMMARY

Embodiments of this application provide a reference signal resource configuration method and an apparatus, to appropriately configure reference signal resources for multiple purposes.

According to a first aspect, a reference signal resource configuration method is provided. The method includes: receiving reference signal resource configuration information from a base station; and when at least two reference signal resources indicated by the reference signal resource configuration information are located on a same orthogonal frequency division multiplexing (orthogonal frequency division multiplexing, OFDM) symbol, mapping one of the at least two reference signal resources to the OFDM symbol.

According to this aspect, when the base station configures concurrency of multiple reference signal resources, the terminal discards, according to a specific rule, a conflicting reference signal resource, to appropriately configure reference signal resources for multiple purposes. This avoids reference signal resource collision, improves communication reliability, and reduces processing complexity of a terminal chip.

In a possible implementation, a first reference signal resource of the at least two reference signal resources is used for a first purpose, a second reference signal resource of the at least two reference signal resources is used for a second purpose, and a terminal maps, to the OFDM symbol, only the first reference signal resource used for the first purpose; or the first reference signal resource of the at least two reference signal resources is used for a first purpose, the second reference signal resource of the at least two reference signal resources is used for a second purpose, and the terminal maps, to the OFDM symbol, only the second reference signal resource used for the second purpose; or the at least two reference signal resources are all used for a second purpose, and a terminal maps, to the OFDM symbol, one of the at least two reference signal resources used for the second purpose, where the first purpose includes any one of beam management, antenna switching, codebook transmission, and non-codebook transmission, and the second purpose includes positioning.

According to this aspect, when the terminal finds that a reference signal resource used for positioning and a reference signal resource used for another purpose that are configured by the base station appear on a same symbol, the terminal may choose to map only the reference signal resource used for positioning or the reference signal resource for another purpose. When the terminal finds that multiple reference signal resources used for positioning configured by the base station appear on a same symbol, the terminal may map, to the symbol, one of the reference signal resources used for positioning.

According to a second aspect, a reference signal resource configuration method is provided. The method includes: sending reference signal resource configuration information to a terminal; and when at least two reference signal resources indicated by the reference signal resource configuration information are located on a same OFDM symbol, receiving one of the at least two reference signal resources that is sent by the terminal on the OFDM symbol.

According to this aspect, a configuration behavior of a base station is not limited. When the base station configures concurrency of multiple reference signal resources, the terminal discards, according to a specific rule, a conflicting reference signal resource, to appropriately configure reference signal resources for multiple purposes. This avoids reference signal resource collision, and improves communication reliability.

In a possible implementation, a first reference signal resource of the at least two reference signal resources is used for a first purpose, a second reference signal resource of the at least two reference signal resources is used for a second purpose, and the terminal maps, to the OFDM symbol, only the first reference signal resource used for the first purpose; or the first reference signal resource of the at least two reference signal resources is used for a first purpose, the second reference signal resource of the at least two reference signal resources is used for a second purpose, and the terminal maps, to the OFDM symbol, only the second reference signal resource used for the second purpose; or the at least two reference signal resources are all used for a second purpose, and the terminal maps, to the OFDM symbol, one of the at least two reference signal resources used for the second purpose, where the first purpose includes any one of beam management, antenna switching, codebook transmission, and non-codebook transmission, and the second purpose includes positioning.

According to a third aspect, a reference signal resource configuration method is provided. The method includes: receiving reference signal resource configuration information from a base station, where N reference signal resources indicated by the reference signal resource configuration information are located on different OFDM symbols, and N is an integer greater than or equal to 2; and mapping the N reference signal resources indicated by the reference signal resource configuration information to different OFDM symbols.

According to this aspect, a reference signal resource configuration behavior of the base station is limited, and time division multiplexing is performed on different reference signal resources, to appropriately configure reference signal resources for multiple purposes. This avoids reference signal resource collision, improves communication reliability, and reduces processing complexity of a terminal chip.

In a possible implementation, the N reference signal resources indicated by the reference signal resource configuration information that are used for positioning occupy different OFDM symbols; or the N reference signal resources indicated by the reference signal resource configuration information that are used for positioning and that have a same cycle correspond to different slot offsets; or the N reference signal resources indicated by the reference signal resource configuration information are used for different purposes, the N reference signal resources occupy different OFDM symbols, or the N reference signal resources correspond to different slot offsets, where the different purposes specifically include any one of beam management, antenna switching, codebook transmission, non-codebook transmission, and positioning.

In this implementation, when the base station configures reference signal resources used for positioning, different reference signal resources occupy different symbols. Alternatively, when configuring multiple reference signal resources that are used for positioning and that have a same cycle, the base station may configure different slot offsets for the multiple reference signal resources, so that the multiple reference signal resources can be mapped to different symbols. Alternatively, when the base station configures reference signal resources for multiple purposes, only reference signal resources for a same purpose are configured on a same symbol, and multiple reference signal resources for different purposes are configured to occupy different symbols in a slot to implement time division multiplexing. Alternatively, when the base station configures reference signal resources for different purposes, time division multiplexing may be implemented by configuring different slot offsets, so that the multiple reference signal resources for different purposes may be mapped to different symbols.

According to a fourth aspect, a reference signal resource configuration method is provided. The method includes: sending reference signal resource configuration information to a terminal, where N reference signal resources indicated by the reference signal resource configuration information are located on different orthogonal frequency division multiplexing OFDM symbols, and N is an integer greater than or equal to 2; and receiving the N reference signal resources based on the reference signal resource configuration information.

In a possible implementation, the N reference signal resources indicated by the reference signal resource configuration information that are used for positioning occupy different OFDM symbols; or the N reference signal resources indicated by the reference signal resource configuration information that are used for positioning and that have a same cycle correspond to different slot offsets (slot offsets); or the N reference signal resources indicated by the reference signal resource configuration information are used for different purposes, the N reference signal resources occupy different OFDM symbols, or the N reference signal resources correspond to different slot offsets, where the different purposes specifically include any one of beam management, antenna switching, codebook transmission, non-codebook transmission, and positioning.

According to a fifth aspect, a reference signal resource configure method is provided. The method includes: reporting capability information to a base station, where the capability information indicates a supported quantity of reference signal resources that can be mapped to a same OFDM symbol; receiving reference signal resource configuration information from the base station, where a quantity of reference signal resources indicated by the reference signal resource configuration information does not exceed the capability information; and mapping, to the OFDM symbol based on the reference signal resource configuration information, the quantity of the reference signal resources indicated by the reference signal resource configuration information.

According to this aspect, a terminal reports its capability of processing a reference signal resource, and the base station appropriately configures a reference signal resource for the terminal based on the capability reported by the terminal, to appropriately configure reference signal resources for multiple purposes. This avoids reference signal resource collision, improves communication reliability, and reduces processing complexity of a terminal chip. In addition, multiple reference signal resources are mapped to a same OFDM symbol, so that time domain resource utilization is improved.

In a possible implementation, the quantity of reference signal resources that can be mapped to the same OFDM symbol includes any one of the following: a quantity of reference signal resources that can be mapped to the same OFDM symbol and that are used for positioning, and a total quantity of reference signal resources that can be mapped to the same OFDM symbol and that are used for positioning and any other purpose; or a quantity of reference signal resources that can be mapped to the same OFDM symbol and that are used for positioning, and a total quantity of reference signal resources that can be mapped to the same OFDM symbol, where the any other purpose includes beam management, antenna switching, codebook transmission, and non-codebook transmission.

In another possible implementation, the quantity of reference signal resources that can be mapped to the same OFDM symbol includes any one of the following: a quantity of reference signal resources that can be mapped to the same OFDM symbol and that are used for positioning; or a total quantity of reference signal resources that can be mapped to the same OFDM symbol.

In still another possible implementation, when the reported quantity of reference signal resources that can be mapped to the same OFDM symbol includes a quantity of reference signal resources that can be mapped to the same OFDM symbol and that are used for positioning, and the reference signal resources indicated by the reference signal resource configuration information include a quantity of reference signal resources used for positioning and reference signal resources used for another purpose, the mapping, to the OFDM symbol based on the reference signal resource configuration information, the quantity of the reference signal resources indicated by the reference signal resource configuration information includes any one of the following operations: when the reference signal resource used for positioning and the reference signal resource used for another purpose have a same time domain behavior, mapping, to the OFDM symbol, only the reference signal resource used for another purpose; or when the reference signal resource used for positioning and the reference signal resource used for another purpose have a same time domain behavior, mapping, to the OFDM symbol, only the reference signal resource used for positioning; or when the reference signal resource used for positioning and the reference signal resource used for another purpose have a same time domain behavior, mapping only a reference signal resource with a longer cycle to the OFDM symbol; or when the reference signal resource used for positioning and the reference signal resource used for another purpose have different time domain behaviors, mapping a reference signal resource with a higher time domain behavior to the OFDM symbol.

According to a sixth aspect, a reference signal resource configure method is provided. The method includes: receiving capability information reported by a terminal, where the capability information indicates a supported quantity of reference signal resources that can be mapped to a same OFDM symbol; sending reference signal resource configuration information to the terminal, where a quantity of reference signal resources indicated by the reference signal resource configuration information does not exceed the capability information; and receiving, on the OFDM symbol based on the reference signal resource configuration information, the quantity of the reference signal resources indicated by the reference signal resource configuration information.

In a possible implementation, the quantity of reference signal resources that can be mapped to the same OFDM symbol includes any one of the following: a quantity of reference signal resources that can be mapped to the same OFDM symbol and that are used for positioning, and a total quantity of reference signal resources that can be mapped to the same OFDM symbol and that are used for positioning and any other purpose; or a quantity of reference signal resources that can be mapped to the same OFDM symbol and that are used for positioning, and a total quantity of reference signal resources that can be mapped to the same OFDM symbol, where the any other purpose includes beam management, antenna switching, codebook transmission, and non-codebook transmission.

In another possible implementation, the quantity of reference signal resources that can be mapped to the same OFDM symbol includes any one of the following: a quantity of reference signal resources that can be mapped to the same OFDM symbol and that are used for positioning; or a total quantity of reference signal resources that can be mapped to the same OFDM symbol.

According to a seventh aspect, a terminal is provided, and may implement the reference signal resource configuration method according to any one of the first aspect, the third aspect, the fifth aspect, or the possible implementations of any one of the foregoing aspects. For example, the terminal may be a chip (for example, a communication chip) or a terminal device. The foregoing method may be implemented by software, by hardware, or by hardware by executing corresponding software.

In a possible implementation, a structure of the terminal includes a processor and a memory. The processor is configured to support the terminal to perform a corresponding function in the foregoing reference signal resource configuration method. The memory is configured to be coupled to the processor, and the memory stores a program (an instruction) and/or data necessary for the terminal. Optionally, the terminal may further include a communication interface, configured to support communication between the terminal and another network element.

In another possible implementation, the terminal may include a unit or a module that performs a corresponding action in the foregoing method.

In still another possible implementation, the terminal includes a processor and a transceiver, where the processor is coupled to the transceiver. The processor is configured to execute a computer program or instructions, to control the transceiver to receive and send information. When the processor executes the computer program or instructions, the processor is further configured to implement the foregoing method. The transceiver may be a transceiver, a transceiver circuit, or an input/output interface. When the terminal is a chip, the transceiver is a transceiver circuit or an input/output interface.

In still another possible implementation, a structure of the terminal includes a processor. The processor is configured to support the terminal to perform a corresponding function in the foregoing reference signal resource configuration method. The terminal may be a chip system, or may be a terminal device or a network device.

In still another possible implementation, a structure of the terminal includes a processor, and the processor is configured to: couple to a memory, read instructions in the memory, and implement the foregoing method based on the instructions.

In still another possible implementation, a structure of the terminal includes a transceiver, configured to implement the foregoing reference signal resource configuration method.

When the terminal is a chip, the transceiver may be an input/output unit, for example, an input/output circuit or a communication interface. When the terminal is user equipment, the transceiver may be a transmitter/receiver machine or a transmitter/receiver.

According to an eighth aspect, a base station is provided, and may implement the reference signal resource configuration method according to any one of the second aspect, the fourth aspect, the sixth aspect, or the possible implementations of any one of the foregoing aspects. For example, the base station may be a chip (such as a baseband chip or a communication chip) or a base station device. The foregoing method may be implemented by using software or hardware, or by hardware executing corresponding software.

In a possible implementation, a structure of the base station includes a processor and a memory. The processor is configured to support the base station to perform a corresponding function in the foregoing reference signal resource configuration method. The memory is configured to be coupled to the processor, and the memory stores a program (an instruction) and data necessary for the base station. Optionally, the base station may further include a communication interface, configured to support communication between the base station and another network element.

In another possible implementation, the base station may include a unit module that performs a corresponding action in the foregoing method.

In still another possible implementation, the base station includes a processor and a transceiver, where the processor is coupled to the transceiver. The processor is configured to execute a computer program or instructions, to control the transceiver to receive and send information. When the processor executes the computer program or instructions, the processor is further configured to implement the foregoing method. The transceiver may be a transceiver, a transceiver circuit, or an input/output interface. When the base station is a chip, the transceiver is a transceiver circuit or an input/output interface.

In still another possible implementation, a structure of the base station includes a processor. The processor is configured to support the base station to perform a corresponding function in the foregoing reference signal resource configuration method.

In still another possible implementation, a structure of the base station includes a processor, and the processor is configured to: couple to a memory, read instructions in the memory, and implement the foregoing method based on the instructions.

In still another possible implementation, a structure of the base station includes a transceiver, configured to implement the foregoing reference signal resource configuration method.

When the base station is a chip, the transceiver may be an input/output unit, for example, an input/output circuit or a communication interface. When the base station is a network device, the transceiver may be a transmitter/receiver machine (which may also be referred to as a transmitter/receiver).

According to a ninth aspect, a computer-readable storage medium is provided. The computer-readable storage medium stores instructions. When the instructions are run on a computer, the computer performs the method in the foregoing aspects.

According to a tenth aspect, a communication chip is provided. The communications chip stores instructions. When the instructions are run on a network device or a terminal device, a computer is enabled to perform the method in the foregoing aspects.

According to an eleventh aspect, a computer program product including instructions is provided. When the computer program product runs on a computer, the computer is enabled to perform the methods according to the foregoing aspects.

According to a twelfth aspect, a communication system is provided. The system includes the terminal according to the seventh aspect and the base station according to the eighth aspect.

DESCRIPTION OF EMBODIMENTS

The following describes embodiments of this application with reference to accompanying drawings in embodiments of this application.

Figure 2:
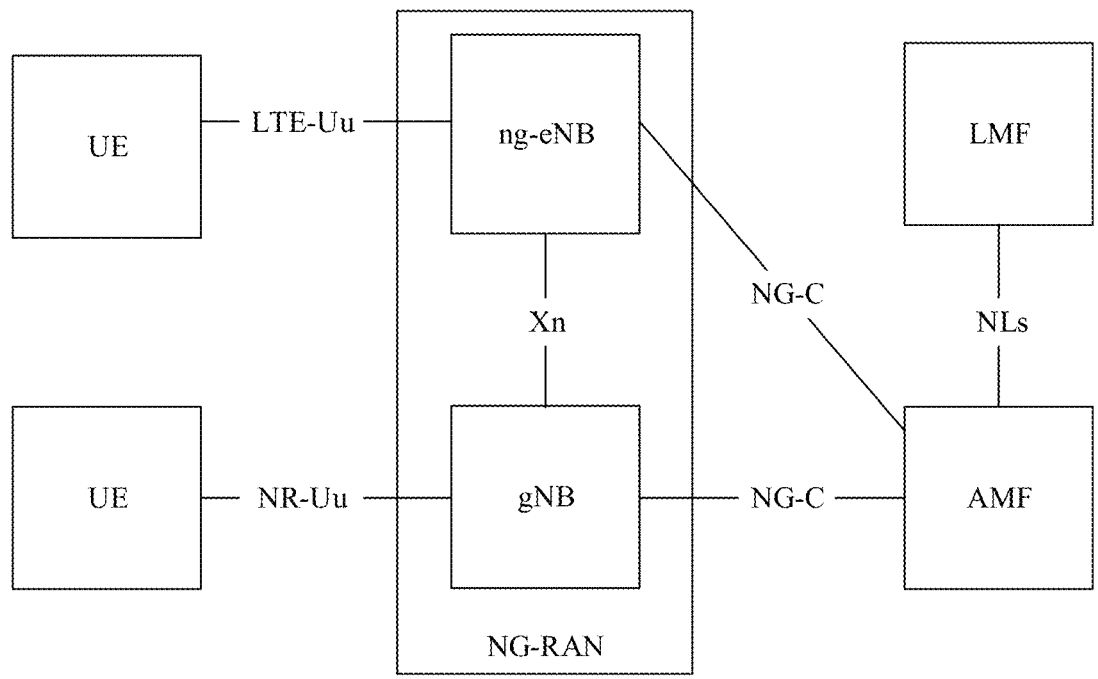
FIG. 2 is a schematic diagram of an architecture of a communication system to which an embodiment of this application is applicable.

For example, FIG. 2 is a schematic diagram of an architecture of a communication system to which this application is applicable. The communication system may include a core network, a radio access network (radio access network, RAN), and a terminal device. The core network may include functions such as an access and mobility management function (access and mobility management function, AMF) and a location management function (location management function, LMF). The AMF may implement functions such as a gateway, and the LMF may implement functions such as a positioning center. Certainly, the core network may further include other network elements, which are not listed one by one herein. The AMF and the LMF may be connected by using an NLs interface. The RAN may include one or more network devices. The network device may be but is not limited to an ng-eNB, a gNB, or the like. The ng-eNB is an LTE base station that accesses a 5G core network, and the gNB is a 5G base station that accesses the 5G core network. The terminal device includes one or more user equipments (user equipment, UE). The radio access network may be connected to the core network by using an NG-C interface and the AMF, and the terminal device is connected to the radio access network by using LTE-Uu and the ng-eNB, or may be connected to the radio access network by using NR-Uu, the ng-eNB, and the gNB.

Figure 3:
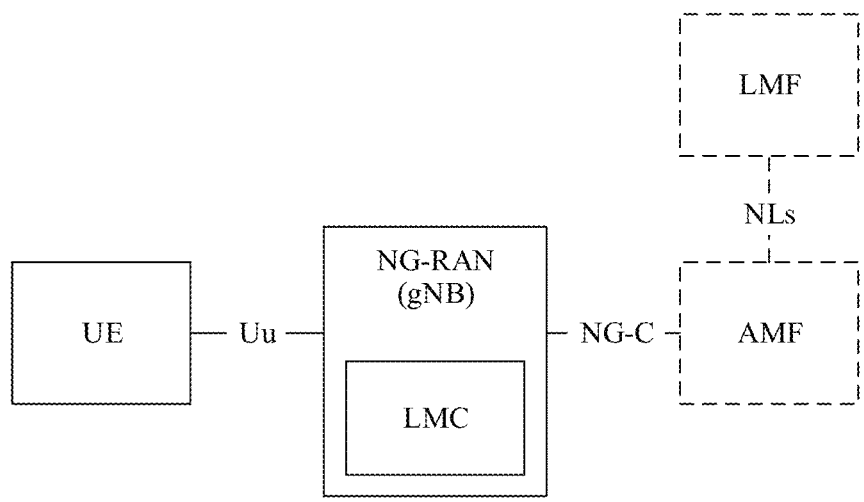
FIG. 3 is a schematic diagram of an architecture of another communication system to which an embodiment of this application is applicable.

FIG. 3 is a schematic diagram of an architecture of another communication system to which this application is applicable. A network device in the communication system may include a location management component (location management component, LMC). The LMC may implement some functions of the LMF, so that the 5G core network does not need to be introduced by using the AMF.

The communication system to which embodiments of this application are applicable may include one or more gNBs and one or more UEs. One gNB may transmit data or control signaling to one or more UEs. Multiple gNBs may simultaneously transmit data or control signaling to one UE.

It should be understood that FIG. 2 and FIG. 3 are merely examples for description, and do not specifically limit a type, a quantity, a connection manner, and the like of network elements included in a communication system to which this application is applicable.

The LMF in embodiments of this application is an apparatus or a component deployed in a core network to provide a positioning function for UE.

The LMC in embodiments of this application is a function component of the LMF, and may be integrated into a gNB on an NG-RAN side.

The base station in this application may be a device that can communicate with a terminal. The base station may be any device with a wireless sending/receiving function, and includes but is not limited to a NodeB (NodeB), an evolved NodeB (eNodeB), a base station in a fifth generation (fifth generation, 5G) communication system, a base station or a base station in a future communication system, an access node in a Wi-Fi system, a wireless relay node, a wireless backhaul node, and the like. The base station may be alternatively a radio controller in a cloud radio access network (cloud radio access network, CRAN) scenario. Alternatively, the base station may be a small cell, a transmission reception point (transmission reception point, TRP), a gNB, a 6G-oriented NodeB, or the like. A specific technology and a specific device form used by the base station are not limited in embodiments of this application.

The terminal in this application is a device having a wireless transceiver function. The device may be a device deployed on land, including an indoor or outdoor device, or a hand-held, wearable, or vehicle-mounted device; may be deployed on a water surface, for example, on a ship; or may be deployed in air, for example, on an aircraft, a balloon, and a satellite. The terminal may be a mobile phone (mobile phone), a tablet computer (pad), a computer having wireless sending and receiving functions, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a wearable device, a vehicle-mounted device, or the like. An application scenario is not limited in embodiments of this application. Sometimes, the terminal is also referred to as user equipment (user equipment, UE), an access terminal device, a UE unit, a mobile station, a remote station, a remote terminal device, a mobile device, a wireless communication device, a UE agent, a UE apparatus, or the like.

It should be noted that terms "system" and "network" may be used interchangeably in embodiments of this application. "Multiple" means two or more. In view of this, "multiple" may also be understood as "at least two" in embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

The following describes a positioning procedure based on uplink in embodiments of this application.

Figure 4:
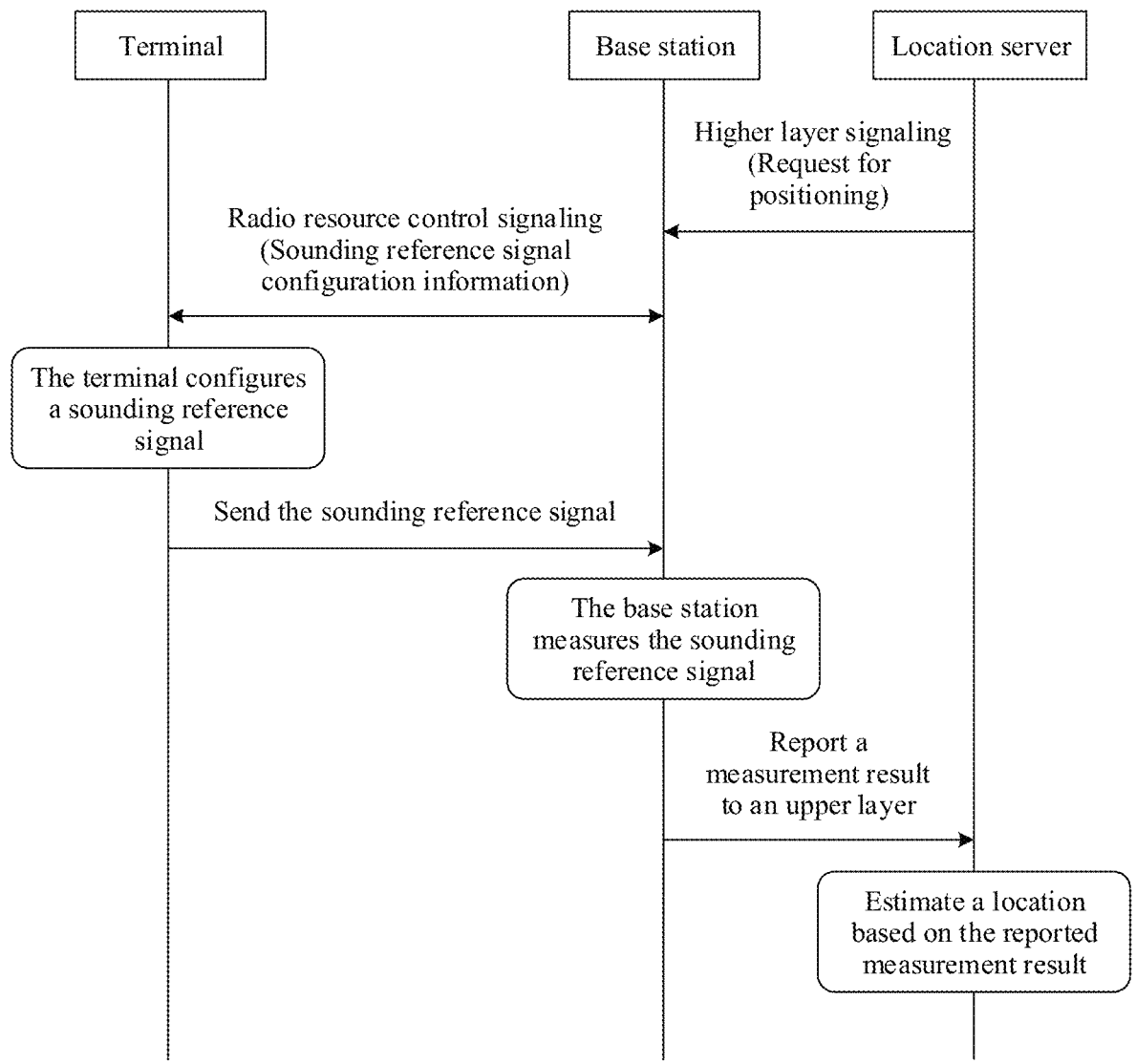
FIG. 4 is a schematic flowchart of positioning based on uplink according to an embodiment of this application.
Figure 5:
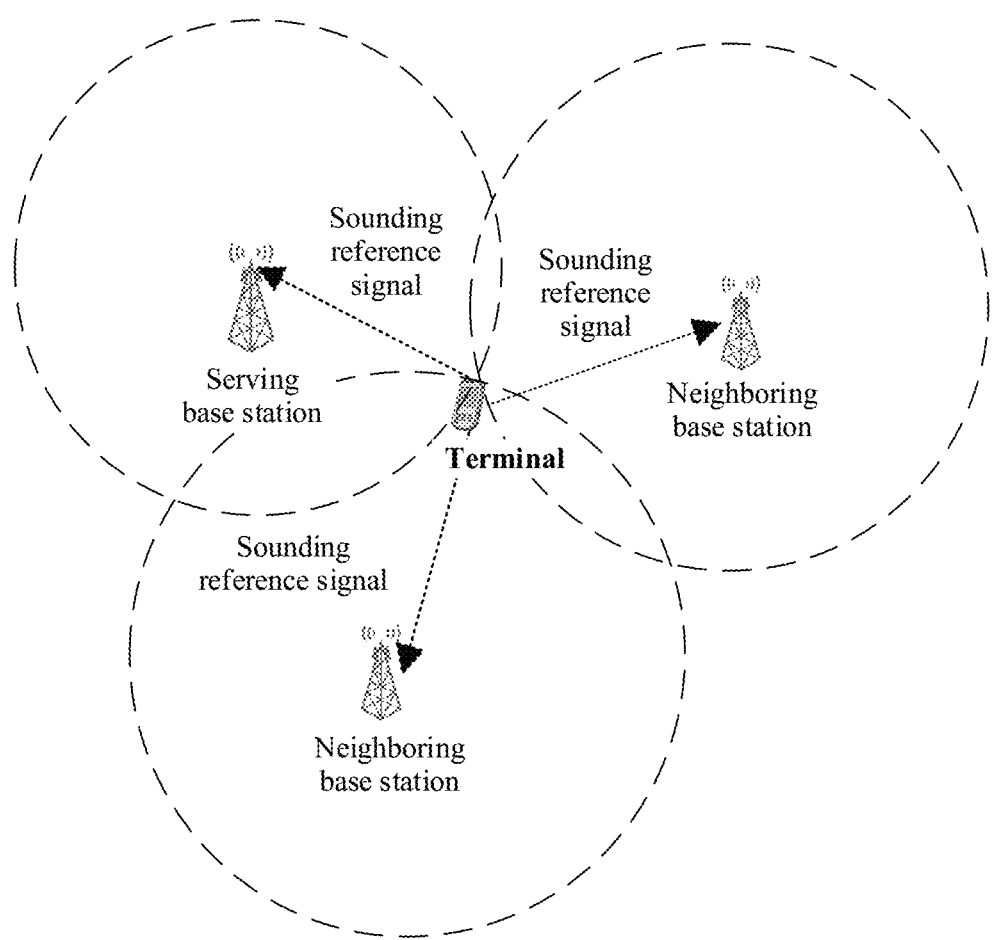
FIG. 5 is a schematic diagram of an example in which a base station performs positioning based on a received SRS resource.

The positioning based on uplink may be, for example, an uplink positioning technology based on a time difference of arrival (uplink-time difference of arrival, UL-TDOA), and an uplink positioning technology based on an angle of arrival (uplink-angle of arrival, UL-AOA). FIG. 4 is a schematic flowchart of positioning based on uplink according to an embodiment of this application. The following several steps are included. First, a serving base station indicates SRS configuration information to a terminal. After receiving an indication from the base station, the terminal starts to send an SRS. Then, as shown in the schematic diagram of FIG. 5 in which a base station performs positioning based on a received SRS resource, the serving base station and a neighboring base station perform related measurement on the received SRS, for example, measure a time of arrival (time of arrival, TOA) of the SRS, an angle of arrival (angle of arrival, AOA), a reference signal received power (reference signal receive power, RSRP), or the like. Finally, the base station reports a measurement result to an LMF or an LMU, and the LMF or the LMU estimates a location based on received measurement information.

In addition, time domain types of reference signal resources in this application are described.

The time domain types of reference signal resources include a periodic reference signal resource, a semi-persistent reference signal resource, and an aperiodic reference signal resource.

The periodic reference signal resource means that after configuration of higher-layer radio resource control (radio resource control, RRC) signaling is completed, the terminal continuously sends a reference signal resource based on a configured cycle. The semi-persistent reference signal resource means that after RRC configuration of a reference signal resource is completed, the terminal does not immediately send the reference signal resource. The terminal device continuously sends the reference signal resource based on a configured cycle after Media Access Control (medium access control-control element, MAC-CE) signaling is activated. Sending is stopped only after the MAC-CE signaling is deactivated. The aperiodic reference signal resource means that after RRC configuration is completed, downlink control information (downlink control information, DCI) is needed to trigger sending the aperiodic reference signal resource, and the aperiodic reference signal resource is sent only once.

This application provides a reference signal resource configuration method and an apparatus to resolve a problem that a terminal may be configured with concurrency of reference signal resources for multiple purposes. A reference signal resource configuration behavior of a base station is limited, and time division multiplexing is performed on different reference signal resources, to avoid collision. Alternatively, a configuration behavior of a base station is not limited. When the base station configures concurrency of multiple reference signal resources, the terminal discards, according to a specific rule, a conflicting reference signal resource. Alternatively, the terminal may report its capability of processing a reference signal resource, and a base station appropriately configures a reference signal resource for the terminal based on the capability reported by the terminal. Therefore, the reference signal resources for multiple purposes are appropriately configured, and this avoids reference signal resource collision, improves communication reliability, and reduces processing complexity of a terminal chip.

Figure 6:
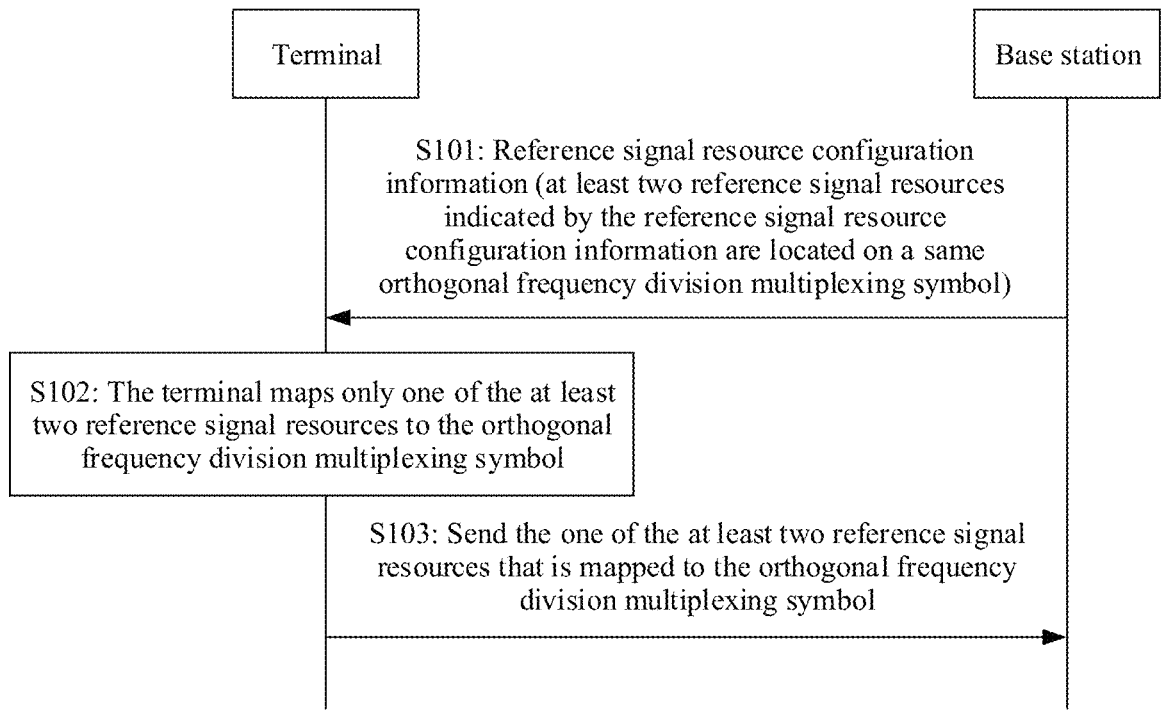
FIG. 6 is a schematic flowchart of a reference signal resource configuration method according to an embodiment of this application.

In a scenario, the configuration behavior of the base station may not be limited. When the base station configures the concurrency of multiple reference signal resources, the terminal discards, according to the specific rule, the conflicting reference signal resource, to appropriately configure the reference signal resources for multiple purposes. This avoids reference signal resource collision, and improves communication reliability. FIG. 6 is a schematic flowchart of a reference signal resource configuration method according to an embodiment of this application. The method may include the following steps.

S101: A base station sends reference signal resource configuration information to a terminal. At least two reference signal resources indicated by the reference signal resource configuration information are located on a same OFDM symbol.

Correspondingly, the terminal receives the reference signal resource configuration information sent by the base station.

Before the terminal sends a reference signal resource, the base station needs to configure sending of the reference signal resource, and configure a bandwidth, a cycle, an initialization value, a time-frequency position, and the like of the reference signal resource. As described above, reference signal resources may be used for multiple purposes, for example, beam management, antenna switching, codebook transmission, non-codebook transmission, and positioning. Multiple reference signal resources configured by the base station may be located on a same OFDM symbol. This embodiment does not limit a configuration behavior of the base station. Therefore, after configuring the multiple reference signal resources, the base station sends the reference signal resource configuration information to the terminal. The at least two reference signal resources indicated by the reference signal resource configuration information are located on the same OFDM symbol. Specifically, the base station may send the reference signal resource configuration information via RRC signaling, system information, or the like. The terminal receives the reference signal resource configuration information sent by the base station.

S102: The terminal maps one of the at least two reference signal resources to the OFDM symbol.

When the base station configures concurrency of multiple reference signal resources, the terminal needs to discard, according to a specific rule, a conflicting reference signal resource, to appropriately configure the reference signal resources for multiple purposes, and avoid reference signal resource collision.

In this embodiment, to avoid collision between reference signal resources, the terminal maps one of the at least two reference signal resources to the OFDM symbol.

The terminal may discard, according to the specific rule, the conflicting reference signal resource. Specifically, there may be the following several implementations.

In an implementation, a first reference signal resource of the at least two reference signal resources is used for a first purpose, a second reference signal resource of the at least two reference signal resources is used for a second purpose, and the terminal maps, to the OFDM symbol, only the first reference signal resource used for the first purpose. The first purpose includes any one of beam management, antenna switching, codebook transmission, and non-codebook transmission, and the second purpose includes positioning. To be specific, if the terminal finds that a reference signal resource used for positioning and the reference signal resource used for the first purpose that are configured by the base station appear on a same OFDM symbol, the terminal discards the reference signal resource used for positioning, and sends, on the OFDM symbol, only the reference signal resource used for the first purpose.

Figure 1:
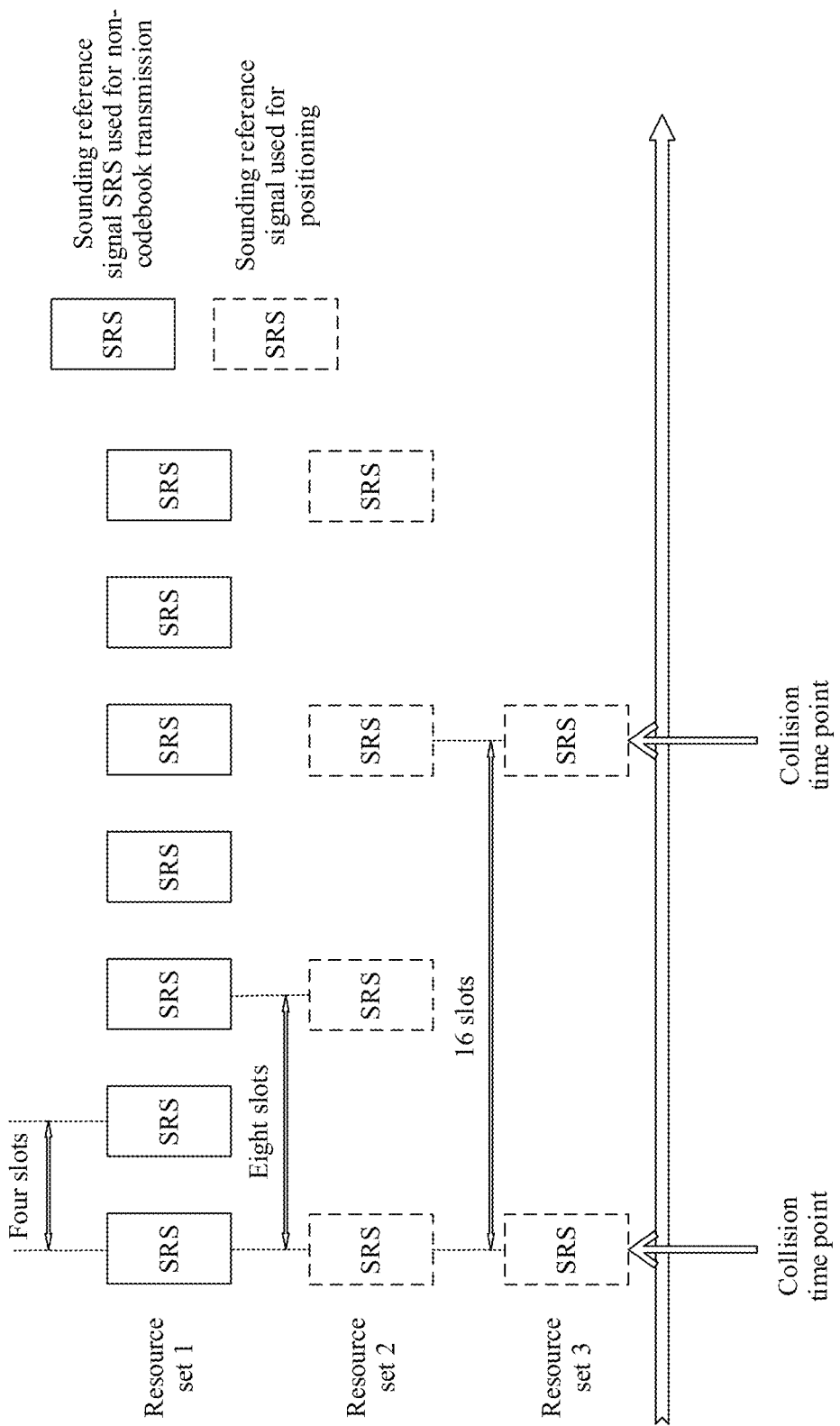
FIG. 1 is a schematic diagram of an example in which SRS resources used for a same purpose or used for different purposes collide at a same time point.

Still refer to the schematic diagram of concurrency of SRS resources for different purposes shown in FIG. 1, when an SRS resource in an SRS resource set 1 used for non-codebook transmission and an SRS resource in an SRS resource set 2 used for positioning are concurrent (in other words, overlap on a symbol), when the terminal receives configuration information sent by the base station, the terminal maps, to one OFDM symbol, only the SRS resource used for non-codebook transmission.

Because a configuration behavior of the base station is not limited, the base station may configure multiple first reference signal resources and multiple second reference signal resources. For example, the terminal may discard the multiple second reference signal resources. For the multiple first reference signal resources, for example, a first reference signal resource with a lower time domain behavior priority is discarded. If there are at least two first reference signal resources that have a same time domain behavior, a first reference signal resource with a shorter cycle may be discarded. If there are still at least two first reference signal resources that have a same cycle, the terminal may randomly select and map one of the at least two first reference signal resources. Alternatively, the terminal may alternately send the at least two first reference signal resources, for example, send the 1st first reference signal resource in the first cycle, and send another first reference signal resource in a next cycle. A sequence of performing discarding actions in the foregoing example may be further adjusted. This is not limited in this application.

For example, the base station configures four SRS resources. Two SRS resources are used for positioning, and two SRS resources are used for beam management. In this case, the terminal first discards the two SRS resources used for positioning. Then, it is assumed that one of the two SRS resources used for beam management is periodic, and the other is aperiodic. Priorities of time-domain behaviors of reference signal resources are as follows: aperiodic >semi-persistent >periodic. The terminal discards the periodic SRS resource, and maps only the aperiodic SRS resource to an OFDM symbol. Alternatively, it is assumed that the two SRS resources used for beam management are both aperiodic, and a cycle of one SRS resource is longer than a cycle of the other SRS resource. In this case, the terminal discards the SRS resource with a shorter cycle, and maps only the SRS resource with a longer cycle to an OFDM symbol.

In another implementation, the first reference signal resource of the at least two reference signal resources is used for the first purpose, the second reference signal resource of the at least two reference signal resources is used for the second purpose, and the terminal maps, to the OFDM symbol, only the second reference signal resource used for the second purpose. The first purpose and the second purpose have the same meanings as those described above. To be specific, if the terminal finds that a reference signal resource used for positioning and a reference signal resource used for the first purpose that are configured by the base station appear on a same OFDM symbol, the terminal discards the reference signal resource used for the first purpose, and sends, on the OFDM symbol, only the reference signal resource used for positioning. If the base station configures the multiple first reference signal resources and configures the multiple second reference signal resources, the terminal may discard other reference signal resources by referring to the foregoing rule of discarding/selecting a reference signal resource by the terminal in the foregoing implementation, and map a selected reference signal resource to the OFDM symbol.

In another implementation, the at least two reference signal resources are all used for the second purpose, and the terminal maps, to the OFDM symbol, one of the at least two reference signal resources used for the second purpose. The second purpose is positioning. To be specific, if the terminal finds that multiple reference signal resources used for positioning configured by the base station appear on a same OFDM symbol, the terminal may map, to the OFDM symbol, one of the reference signal resources used for positioning. If the base station configures the multiple reference signal resources used for positioning, the terminal may discard other reference signal resources by referring to the foregoing rule of discarding/selecting a reference signal resource by the terminal in the foregoing implementation, and may a selected reference signal resource to the OFDM symbol.

Still refer to the schematic diagram of concurrency of SRS resources for a same purposes shown in FIG. 1, when an SRS resource in an SRS resource set 2 used for positioning and an SRS resource in an SRS resource set 3 used for positioning are concurrent (in other words, overlap on a symbol), the terminal may discard the SRS resource in the resource set 2 or the resource set 3, and map one of the SRS resources in the resource sets to the OFDM symbol.

It may be understood that the concurrent reference signal resources (regardless of the purposes) in this embodiment belong to a same time domain type (periodic, semi-persistent, or aperiodic), in other words, the concurrent reference signal resources are periodic, or the concurrent reference signal resources are semi-persistent, or the concurrent reference signal resources are aperiodic.

S103: The terminal sends, to the base station, the one of the at least two reference signal resources that is mapped to the OFDM symbol.

Correspondingly, the base station receives the one of the at least two reference signal resources that is mapped to the OFDM symbol.

In the foregoing step, the terminal discards one of the at least two reference signal resources, and maps one of the at least two reference signal resources to the OFDM symbol. Consequently, the terminal sends, to the base station, the one of the at least two reference signal resources that is mapped to the OFDM symbol. Because the terminal processes the conflicting reference signal resource, the base station can receive the one of the at least two reference signal resources that is mapped to the OFDM symbol in a timely manner.

Further, because the base station receives one of the at least two reference signal resources that is mapped to the OFDM symbol, when subsequently configuring the reference signal resource for the terminal, the base station does not configure the terminal to concurrently use at least two reference signal resources on the same OFDM symbol.

According to the reference signal resource configuration method provided in this embodiment of this application, when the base station configures concurrency of the multiple reference signal resources, the terminal discards, according to the specific rule, the conflicting reference signal resource, to appropriately configure the reference signal resources for multiple purposes. This avoids reference signal resource collision, improves communication reliability, and reduces processing complexity of a terminal chip.

Figure 7:
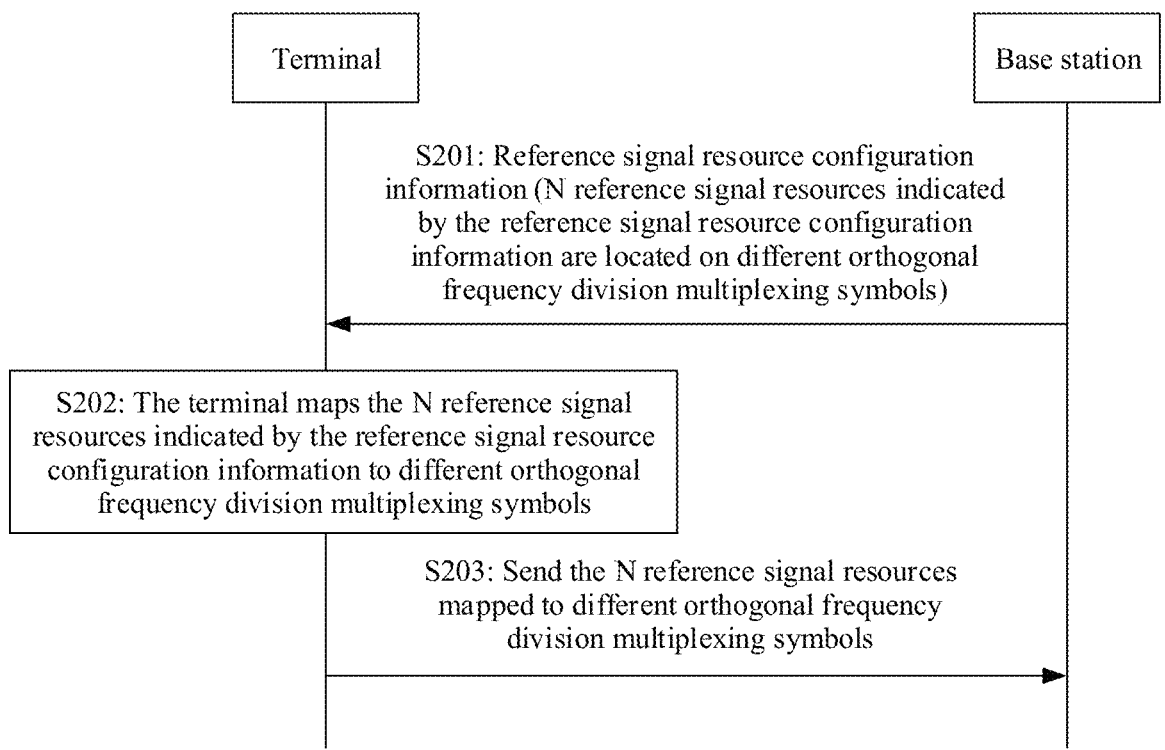
FIG. 7 is a schematic flowchart of another reference signal resource configuration method according to an embodiment of this application.

In another scenario, a reference signal resource configuration behavior of a base station may be limited, and time division multiplexing is performed on different reference signal resources, to appropriately configure reference signal resources for multiple purposes. This avoids reference signal resource collision and improves communication reliability. FIG. 7 is a schematic flowchart of another reference signal resource configuration method according to an embodiment of this application. The method may include the following steps.

S201: A base station sends reference signal resource configuration information to a terminal, where N reference signal resources indicated by the reference signal resource configuration information are located on different OFDM symbols, and N is an integer greater than or equal to 2.

Correspondingly, the terminal receives the reference signal resource configuration information.

As described above, reference signal resources may be used for multiple purposes, for example, beam management, antenna switching, codebook transmission, non-codebook transmission, and positioning. The terminal needs to send, to the base station, multiple reference signal resources used for different purposes or for a same purpose. Before the terminal sends a reference signal resource, the base station needs to configure sending of the reference signal resource, and configure a bandwidth, a cycle, an initialization value, a time-frequency position, and the like of the reference signal resource. This embodiment may limit configuration by the base station. Specifically, the base station configures the multiple reference signal resources to be located on different OFDM symbols. The base station sends the reference signal resource configuration information to the terminal, where multiple reference signal resources indicated by the reference signal resource configuration information are located on different OFDM symbols. Specifically, the base station may send the reference signal resource configuration information via RRC signaling, system information, or the like. The terminal receives the reference signal resource configuration information.

S202: The terminal maps the N reference signal resources indicated by the reference signal resource configuration information to different OFDM symbols.

After receiving the reference signal resource configuration information, the terminal maps the multiple reference signal resources indicated by the reference signal resource configuration information to different OFDM symbols, to avoid collision between the multiple reference signal resources.

Figure 8:
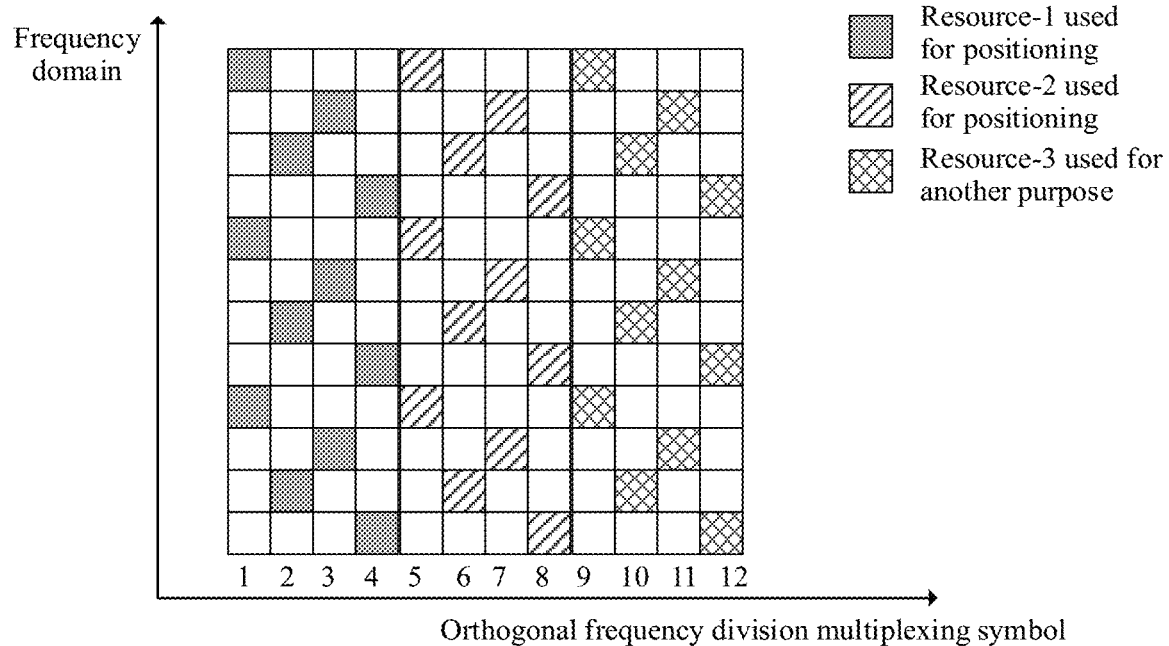
FIG. 8 is a schematic diagram of configuring multiple reference signal resources in one slot.

Specifically, in an implementation, the N reference signal resources for positioning indicated by the reference signal resource configuration information occupy different OFDM symbols. In other words, when the base station configures reference signal resources for positioning, different reference signal resources occupy different OFDM symbols. For example, FIG. 8 is a schematic diagram of configuring multiple reference signal resources in one slot (12 OFDM symbols). Different start symbol locations are configured for a resource-1 (resource-1) for positioning and a resource-2 (resource-2) for positioning in one slot, and different symbol locations are occupied, to avoid collision.

Figure 9:
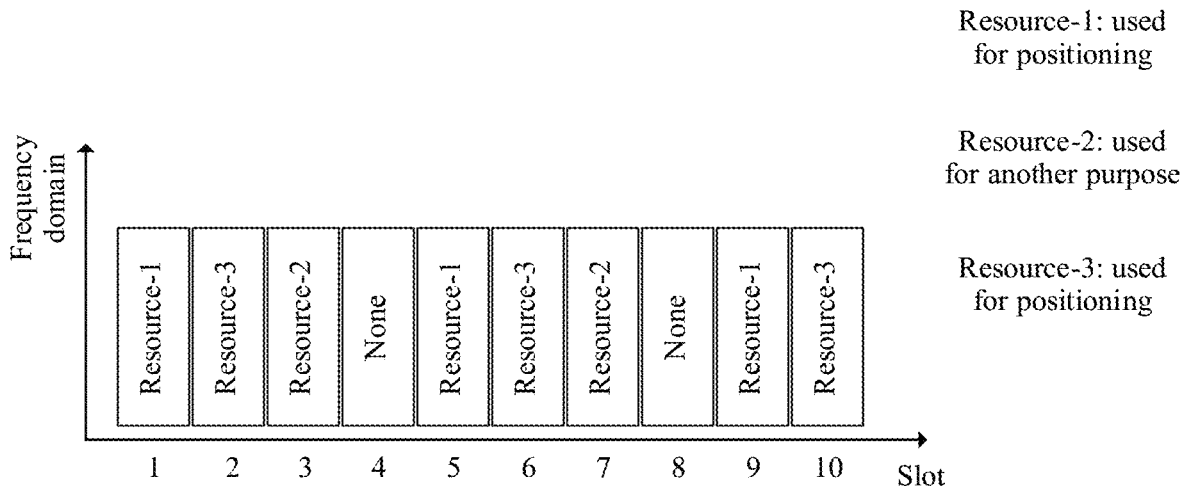
FIG. 9 is a schematic diagram of configuring multiple reference signal resources in multiple slots.

In another implementation, the N reference signal resources indicated by the reference signal resource configuration information that are used for positioning and that have a same cycle correspond to different slot offsets. To be specific, when configuring the multiple reference signal resources that are used for positioning and that have a same cycle, the base station may configure different slot offsets for the multiple reference signal resources, so that the multiple reference signal resources can be mapped to different OFDM symbols. FIG. 9 is a schematic diagram of configuring multiple reference signal resources in multiple slots. Although cycles of both a resource-1 (resource-1) used for positioning and a resource-3 (resource-3) used for positioning are four slots, the resource-1 and the resource-3 are located at different slot offsets, so that the resource-1 and the resource-3 may be mapped to different OFDM symbols to avoid collision.

In another implementation, the N reference signal resources indicated by the reference signal resource configuration information are used for different purposes, and the N reference signal resources occupy different OFDM symbols. The different purposes specifically include any one of the following purposes: beam management, antenna switching, codebook transmission, non-codebook transmission, and positioning. In other words, when the base station configures reference signal resources for multiple purposes, only reference signal resources for a same purpose are configured on a same OFDM symbol, and multiple reference signal resources for different purposes are configured to occupy different OFDM symbols in a slot to implement time division multiplexing. Still refer to FIG. 8. The resource-1 (resource-1) used for positioning and a resource-3 (resource-3) used for another purpose occupy different symbol locations in one slot, to avoid collision.

In another implementation, the N reference signal resources indicated by the reference signal resource configuration information are used for different purposes, and the N reference signal resources correspond to different slot offsets. Meanings of the different purposes are the same as those described above. To be specific, when configuring reference signal resources for different purposes, the base station may implement time division multiplexing by configuring different slot offsets, so that multiple reference signal resources for different purposes may be mapped to different OFDM symbols. Still refer to FIG. 9. The resource-1 (resource-1) used for positioning and a resource-2 (resource-2) used for another purpose have different slot offsets. The slot offset of the resource-1 is {0}, and the slot offset of the resource-2 is {2}. Therefore, the resource-1 and the resource-2 may be mapped to different OFDM symbols.

S203: The terminal sends, to the base station, the N reference signal resources mapped to different OFDM symbols.

Correspondingly, the base station receives the N reference signal resources based on the reference signal resource configuration information.

After the terminal maps the N reference signal resources indicated by the reference signal resource configuration information to different OFDM symbols, the terminal sends, to the base station, the multiple reference signal resources mapped to different OFDM symbols. The base station receives the multiple reference signal resources for measurement for a same purpose or different purposes.

According to the reference signal resource configuration method provided in this embodiment of this application, a reference signal resource configuration behavior of a base station is limited, and time division multiplexing is performed on different reference signal resources, to appropriately configure reference signal resources for multiple purposes. This avoids reference signal resource collision, improves communication reliability, and reduces processing complexity of a terminal chip.

Figure 10:
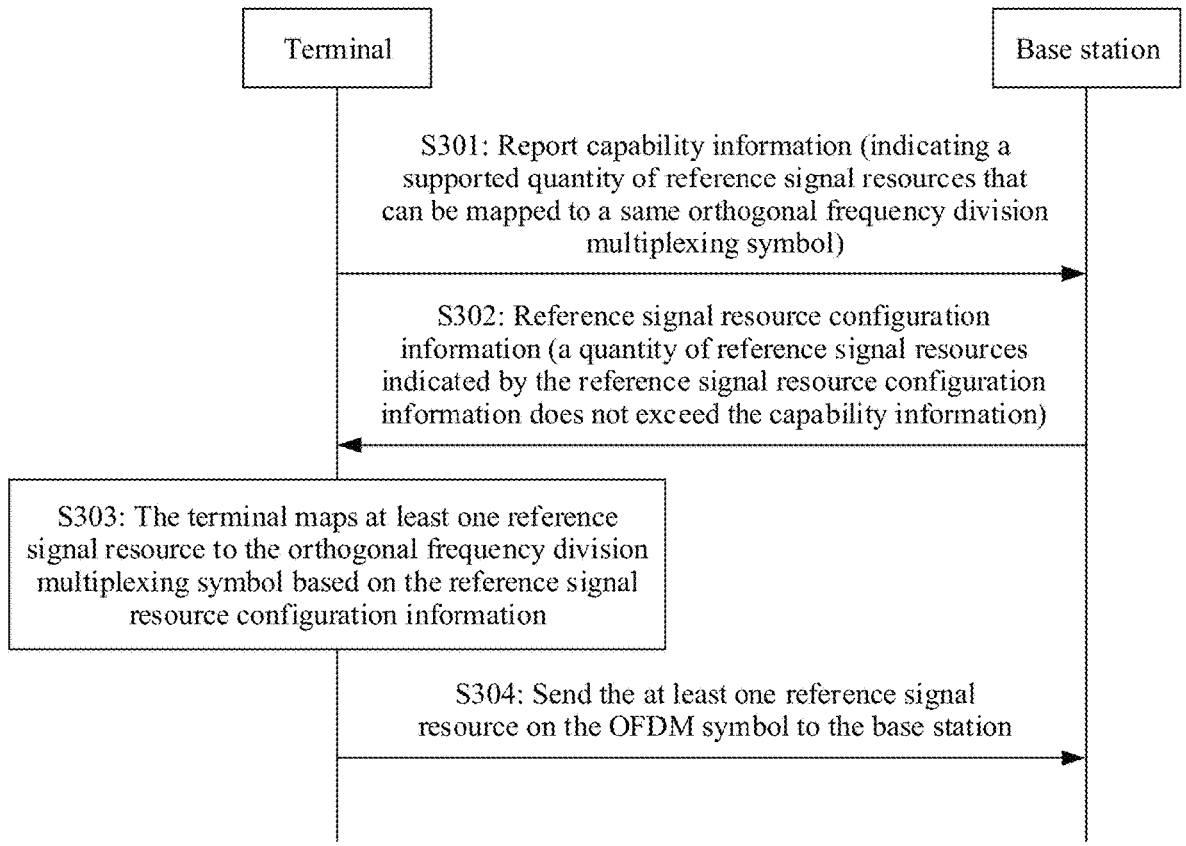
FIG. 10 is a schematic flowchart of another reference signal resource configuration method according to an embodiment of this application.

In still another scenario, a terminal may report its capability of processing a reference signal resource, and a base station appropriately configures a reference signal resource for the terminal based on the capability reported by the terminal, to appropriately configure reference signal resources for multiple purposes. This avoids reference signal resource collision and improves communication reliability. FIG. 10 is a schematic flowchart of another reference signal resource configuration method according to an embodiment of this application. The method may include the following steps.

S301: A terminal reports capability information to a base station, where the capability information indicates a supported quantity of reference signal resources that can be mapped to a same OFDM symbol.

Correspondingly, the base station receives the capability information reported by the terminal.

Whether the terminal can concurrently use reference signal resources on a same OFDM symbol depends on a chip processing capability of the terminal and the like, and specifically, depends on the quantity, supported by the terminal, of reference signal resources that can be mapped to the same OFDM symbol.

In this embodiment, the terminal reports the capability information to the base station, where the capability information indicates the supported quantity of reference signal resources that can be mapped to the same OFDM symbol. The base station receives the capability information reported by the terminal, so that the base station can obtain the quantity, supported by the terminal, of reference signal resources that can be mapped to the same OFDM symbol.

S302: The base station sends reference signal resource configuration information to the terminal, where a quantity of reference signal resources indicated by the reference signal resource configuration information does not exceed the capability information.

Correspondingly, the terminal receives the reference signal resource configuration information from the base station.

After receiving the capability information reported by the terminal, the base station configures reference signal resources for the terminal based on a capability of the terminal. The quantity of concurrent reference signal resources on the same OFDM symbol that are configured by the base station for the terminal does not exceed the foregoing capability information. Therefore, the base station sends the reference signal resource configuration information to the terminal, where the quantity of reference signal resources indicated by the reference signal resource configuration information does not exceed the capability information. The base station may send the reference signal resource configuration information via RRC signaling, system information, or the like.

S303: The terminal maps, to the OFDM symbol based on the reference signal resource configuration information, the quantity of the reference signal resources indicated by the reference signal resource configuration information.

The base station delivers the reference signal resource configuration information based on the capability information reported by the terminal. Therefore, after the terminal receives the reference signal resource configuration information, the terminal maps at least one reference signal resource to the OFDM symbol based on the reference signal resource configuration information, and a quantity of mapped reference signal resources does not exceed the capability of the terminal.

S304: The terminal sends, to the base station on the OFDM symbol, the quantity of reference signal resources indicated by the reference signal resource configuration information.

Correspondingly, the base station receives, on the OFDM symbol based on the reference signal resource configuration information, the quantity of the reference signal resources indicated by the reference signal resource configuration information.

After mapping the reference signal resources to the OFDM symbol based on the reference signal resource configuration information, the terminal sends the reference signal resources to the base station on the OFDM symbol. The reference signal resources may be used for one or more purposes. In this embodiment, the multiple reference signal resources may be mapped to the same OFDM symbol. This improves time domain resource utilization.

Specifically, the capability information reported by the terminal may include the following several implementations.

In an implementation, the terminal reports a quantity of reference signal resources that can be mapped to a same OFDM symbol and that are used for positioning, and a total quantity of reference signal resources that can be mapped to the same OFDM symbol and that are used for positioning and any other purpose. The any other purpose includes beam management, antenna switching, codebook transmission, and non-codebook transmission.

For example, the terminal reports a quantity N1 of SRS resources that can be mapped to a same OFDM symbol and that are used for positioning. Possible candidate values of N1 are {1, 2, 4, 6, 8}. The terminal reports a total quantity N1+N2 of SRS resources that can be mapped to the same OFDM symbol and that are used for positioning and non-codebook transmission. Possible candidate values of N1+N2 are {1, 2, 4, 8, 12}. In addition, the terminal may further report, or the base station may be informed of, beforehand, a quantity N2 of SRS resources that can be mapped by the terminal to the same OFDM symbol and that are used for non-codebook transmission (or codebook transmission, beam management, or antenna switching). Possible candidate values of N2 are {1, 2, 3, 4}. It may be understood that the candidate values of N1 and the candidate values of N2 are merely examples.

Specifically, for example, if the quantity N1, reported by the terminal, of SRS resources that can be mapped to the same OFDM symbol and that are used for positioning is 4, the total quantity N1+N2, reported by the terminal, of SRS resources that can be mapped to the same OFDM symbol and that are used for positioning and non-codebook transmission is 6, and the quantity N2 of SRS resources that can be mapped by the terminal to the same OFDM symbol and that are used for non-codebook transmission (or codebook transmission, beam management, or antenna switching) is 4, SRS resources that can be configured by the base station on the same OFDM symbol need to satisfy N1≤4, N2≤4, an N1+N2≤6.

For the foregoing capability information, the following Table 1 shows examples of several base station configurations.

TABLE 1

| Quantity N1 of SRS resources used for positioning | Quantity N2 of SRS resources used for non-codebook transmission | Supported/Not supported |
| --- | --- | --- |
| 5 | 1 | Not supported |
| 4 | 4 | Not supported |
| 4 | 1 | Supported |
| 4 | 2 | Supported |
| 4 | 3 | Supported |

It can be learned from Table 1 that, when a quantity of SRS resources used for positioning is 5, and a quantity of SRS resources used for non-codebook transmission is 1, because the quantity of SRS resources used for positioning exceeds the quantity, reported by the terminal, of SRS resources that can be mapped to the same OFDM symbol and that are used for positioning (where the quantity reported by the terminal is 4 in the foregoing example), this configuration by the base station is not supported. When a quantity of SRS resources used for positioning is 4, and a quantity of SRS resources used for non-codebook transmission is 4, because a total quantity of the SRS resources used for positioning and the SRS resources used for non-codebook transmission is 8, the total quantity exceeds the total quantity, reported by the terminal, of SRS resources used for positioning and SRS resources used for non-codebook transmission (where the quantity reported by the terminal is 6 in the foregoing example).

In another implementation, the terminal reports a quantity of reference signal resources that can be mapped to a same OFDM symbol and that are used for positioning, and the terminal reports a total quantity of reference signal resources that can be mapped to the same OFDM symbol. The total quantity is a total quantity of reference signal resources that can be mapped by the terminal to the same OFDM symbol and that are used for multiple purposes. The multiple purposes include beam management, antenna switching, codebook transmission, non-codebook transmission, and positioning.

For example, the terminal reports a quantity N3 of reference signal resources that can be mapped to a same OFDM symbol and that are used for positioning. Candidate values of N3 are {1, 2, 4, 6, 8}. The terminal also reports a total quantity N4 of reference signal resources that can be mapped by the terminal to the same OFDM symbol. Candidate values of N4 are {1, 2, 4, 8, 12}. It may be understood that the candidate values of N3 and the candidate values of N4 are merely examples. It may be understood that, if N3=1 and N4=1 is reported, it indicates that the terminal does not support concurrency of a reference signal resource used for positioning and a reference signal resource used for another purpose, and does not expect a reference signal resource used for positioning and a reference signal resource used for another purpose that are configured by the base station to be located on a same OFDM symbol.

Specifically, for example, if the quantity N3, reported by the terminal, of reference signal resources that can be mapped to the same OFDM symbol and that are used for positioning is 4, and the total quantity N4 of reference signal resources that can be mapped by the terminal to the same OFDM symbol is 8, SRS resources that can be configured by the base station on the same OFDM symbol need to satisfy $N3 \leq 4$ and $N4 \leq 8$.

For the foregoing capability information, the following Table 2 shows examples of several base station configurations.

TABLE 2

| Quantity N3 of SRS resources used for positioning | Quantity of SRS resources used for another purpose | Supported/Not supported |
| --- | --- | --- |
| 4 | 6 | Not supported |
| 4 | 4 | Supported |
| 0 | 8 | Supported |

In Table 2, a total quantity of SRS resources used for positioning and SRS resources used for another purpose is 10, which is greater than the total quantity N4 (in the foregoing example, N4=8) of reference signal resources that can be mapped by the terminal to the same OFDM symbol. Therefore, this configuration by the base station is not supported.

In another implementation, the terminal reports a quantity N5 of reference signal resources that can be mapped to a same OFDM symbol and that are used for positioning. For example, the terminal reports N5. Candidate values of N5 are $\{1,2,4,6,8,16\}$. The base station configures, for the terminal based on the capability information reported by the terminal, reference signal resources used for positioning. A quantity of configured reference signal resources used for positioning does not exceed N5.

The terminal does not report a quantity of reference signal resources that can be mapped to the same OFDM symbol and that are used for another purpose, but the base station needs to configure a reference signal resource used for another purpose. If the terminal finds that a reference signal resource used for positioning and a reference signal resource used for another purpose that are configured by the base station collides on the OFDM symbol, the terminal may have the following collision resolution manners.

One collision resolution manner is: when the reference signal resource used for positioning and the reference signal resource used for another purpose have a same time domain behavior, the terminal may map, to the OFDM symbol, only the reference signal resource used for another purpose. The same time domain behavior means that both the reference signal resource used for positioning and the reference signal resource used for another purpose are periodic reference signal resources, semi-persistent reference signal resources, or aperiodic reference signal resources.

Another collision resolution manner is: when the reference signal resource used for positioning and the reference signal resource used for another purpose have a same time domain behavior, the terminal may map, to the OFDM symbol, only the reference signal resource used for positioning.

Another collision resolution manner is: when the reference signal resource used for positioning and the reference signal resource used for another purpose have a same time domain behavior, the terminal may map only a reference signal resource with a longer cycle to the OFDM symbol.

Another collision resolution manner is: when the reference signal resource used for positioning and the reference signal resource used for another purpose have different time domain behavior, the terminal may map a reference signal resource with a higher time domain behavior to the OFDM symbol. The reference signal resource used for positioning and the reference signal resource used for another purpose have different time domain behaviors. For example, the reference signal resource used for positioning may be periodic, and the reference signal resource used for another purpose is semi-persistent; or the reference signal resource used for positioning may be aperiodic, and the reference signal resource used for another purpose is semi-persistent.

For example, priorities of time domain behaviors of reference signal resources are: aperiodic >semi-persistent >periodic. To be specific, when an aperiodic reference signal resource collides with a periodic or semi-persistent reference signal resource on a same OFDM symbol, the terminal preferentially transmits the aperiodic reference signal resource, and discards another conflicting reference signal resource on the symbol; or when a semi-persistent reference signal resource collides with a periodic reference signal resource on a same OFDM symbol, the terminal preferentially transmits the semi-persistent reference signal resource, and discards another conflicting reference signal resource on the symbol.

In another implementation, the terminal reports a total quantity N6 of reference signal resources that can be mapped to a same OFDM symbol. For example, the terminal reports N6. Candidate values of N6 are $\{1,2,4,6,8,16\}$. The base station configures, for the terminal based on the capability information reported by the terminal, reference signal resources used for one or more purposes. A quantity of configured reference signal resources does not exceed N6.

According to the reference signal resource configuration method provided in this embodiment of this application, the terminal reports its capability of processing a reference signal resource, and the base station appropriately configures a reference signal resource for the terminal based on the capability reported by the terminal, to appropriately configure reference signal resources for multiple purposes. This avoids reference signal resource collision, improves communication reliability, and reduces processing complexity of a terminal chip. In addition, at least one reference signal resource is mapped to the same OFDM symbol, so that time domain resource utilization is improved.

Figure 11:
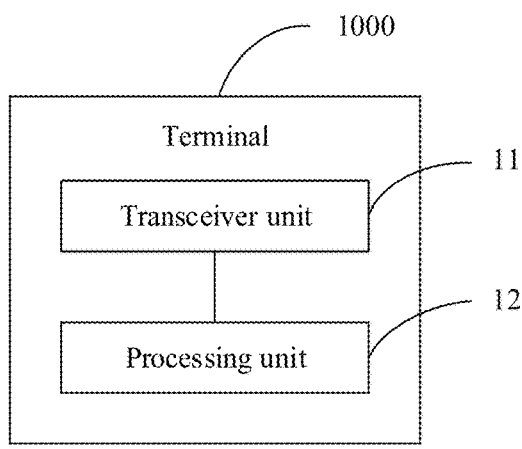
FIG. 11 is a schematic diagram of a structure of a terminal according to an embodiment of this application.

Based on the same concept as the foregoing reference signal resource configuration method, an embodiment of this application further provides a terminal. As shown in FIG. 11, the terminal 1000 includes a transceiver unit 11 and a processing unit 12.

The transceiver unit 11 is configured to receive reference signal resource configuration information from a base station.

The processing unit 12 is configured to: when at least two reference signal resources indicated by the reference signal resource configuration information are located on a same OFDM symbol, map one of the at least two reference signal resources to the OFDM symbol.

For the transceiver unit 11 and the processing unit 12, refer to related descriptions of the terminal in the embodiment shown in FIG. 6.

According to the terminal provided in this embodiment of this application, when the base station configures concurrency of the multiple reference signal resources, the terminal discards, according to the specific rule, the conflicting reference signal resource, to appropriately configure the reference signal resources for multiple purposes. This avoids reference signal resource collision, improves communication reliability, and reduces processing complexity of a terminal chip.

Figure 12:
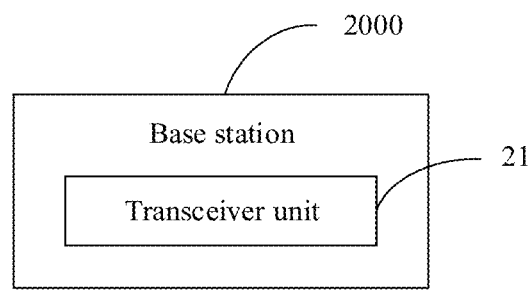
FIG. 12 is a schematic diagram of a structure of a base station according to an embodiment of this application.

Based on the same concept as the foregoing reference signal resource configuration method, an embodiment of this application further provides a base station. As shown in FIG. 12, the base station 2000 includes a transceiver unit 21.

The transceiver unit 21 is configured to send reference signal resource configuration information to a terminal.

The transceiver unit 21 is further configured to: when at least two reference signal resources indicated by the reference signal resource configuration information are located on a same OFDM symbol, receive one of the at least two reference signal resources that is sent by the terminal on the OFDM symbol.

For specific implementation of the transceiver unit 21, refer to related descriptions of the base station in the embodiment shown in FIG. 6.

According to the base station provided in this embodiment of this application, a configuration behavior of the base station is not limited. When the base station configures concurrency of multiple reference signal resources, the terminal discards, according to a specific rule, a conflicting reference signal resource, to appropriately configure reference signal resources for multiple purposes. This avoids reference signal resource collision, improves communication reliability, and reduces processing complexity of a terminal chip.

Figure 13:
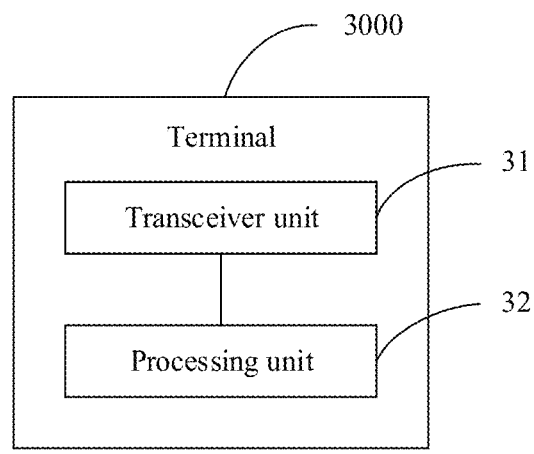
FIG. 13 is a schematic diagram of a structure of another terminal according to an embodiment of this application.

Based on the same concept as the foregoing reference signal resource configuration method, an embodiment of this application further provides a terminal. As shown in FIG. 13, the terminal 3000 includes a transceiver unit 31 and a processing unit 32.

The transceiver unit 31 is configured to receive reference signal resource configuration information from a base station, where N reference signal resources indicated by the reference signal resource configuration information are located on different OFDM symbols, and N is an integer greater than or equal to 2.

The processing unit 32 is configured to map the N reference signal resources indicated by the reference signal resource configuration information to different OFDM symbols.

For specific implementations of the transceiver unit 31 and the processing unit 32, refer to related descriptions of the terminal in the method embodiment shown in FIG. 7.

According to the terminal provided in this embodiment of this application, a reference signal resource configuration behavior of the base station is limited, and time division multiplexing is performed on different reference signal resources, to appropriately configure reference signal resources for multiple purposes. This avoids reference signal resource collision, improves communication reliability, and reduces processing complexity of a terminal chip.

Figure 14:
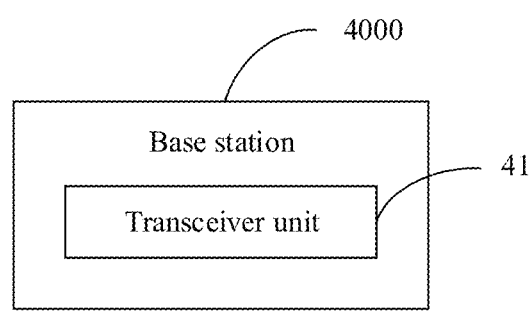
FIG. 14 is a schematic diagram of a structure of another base station according to an embodiment of this application.

Based on the same concept as the foregoing reference signal resource configuration method, an embodiment of this application further provides a base station. As shown in FIG. 14, the base station 4000 includes a transceiver unit 41.

The transceiver unit 41 is configured to send reference signal resource configuration information to a terminal, where N reference signal resources indicated by the reference signal resource configuration information are located on different orthogonal frequency division multiplexing OFDM symbols, and N is an integer greater than or equal to 2.

The transceiver unit 41 is further configured to receive the N reference signal resources based on the reference signal resource configuration information.

For specific implementation of the transceiver unit 41, refer to related descriptions of the base station in the method embodiment shown in FIG. 7.

According to the base station provided in this embodiment of this application, a reference signal resource configuration behavior of the base station is limited, and time division multiplexing is performed on different reference signal resources, to appropriately configure reference signal resources for multiple purposes. This avoids reference signal resource collision, improves communication reliability, and reduces processing complexity of a terminal chip.

Figure 15:
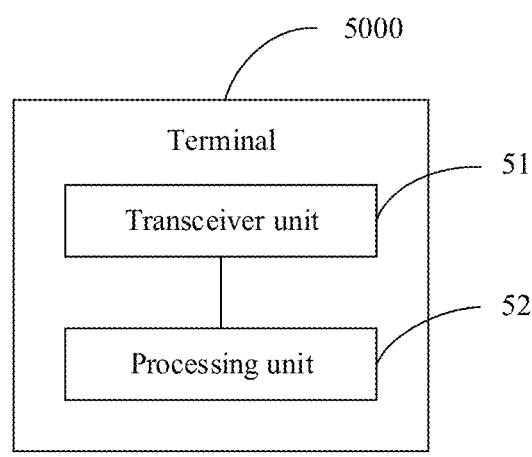
FIG. 15 is a schematic diagram of a structure of another terminal according to an embodiment of this application.

Based on the same concept as the foregoing reference signal resource configuration method, an embodiment of this application further provides a terminal. As shown in FIG. 15, the terminal 5000 includes a transceiver unit 51 and a processing unit 52.

The transceiver unit 51 is configured to report capability information to a base station, where the capability information indicates a supported quantity of reference signal resources that can be mapped to a same OFDM symbol.

The transceiver unit 51 is further configured to receive reference signal resource configuration information from the base station, where a quantity of reference signal resources indicated by the reference signal resource configuration information does not exceed the capability information.

The processing unit 52 is configured to map, to the OFDM symbol based on the reference signal resource configuration information, the quantity of the reference signal resources indicated by the reference signal resource configuration information.

In an implementation, when the reported quantity of reference signal resources that can be mapped to the same OFDM symbol includes a quantity of reference signal resources that can be mapped to the same OFDM symbol and that are used for positioning, and the reference signal resources indicated by the reference signal resource configuration information include a quantity of reference signal resources used for positioning and reference signal resources used for another purpose, the processing unit 52 performs any one of the following operations: when the reference signal resource used for positioning and the reference signal resource used for another purpose have a same time domain behavior, mapping, to the OFDM symbol, only the reference signal resource used for another purpose; or when the reference signal resource used for positioning and the reference signal resource used for another purpose have a same time domain behavior, mapping, to the OFDM symbol, only the reference signal resource used for positioning; or when the reference signal resource used for positioning and the reference signal resource used for another purpose have a same time domain behavior, mapping only a reference signal resource with a longer cycle to the OFDM symbol; or when the reference signal resource used for positioning and the reference signal resource used for another purpose have different time domain behaviors, mapping a reference signal resource with a higher time domain behavior to the OFDM symbol.

For specific implementations of the transceiver unit 51 and the processing unit 52, refer to related descriptions of the terminal in the method embodiment shown in FIG. 10.

According to the terminal provided in this embodiment of this application, a terminal reports its capability of processing a reference signal resource, and the base station appropriately configures a reference signal resource for the terminal based on the capability reported by the terminal, to appropriately configure reference signal resources for multiple purposes. This avoids reference signal resource collision, improves communication reliability, and reduces processing complexity of a terminal chip. In addition, at least one reference signal resource is mapped to a same OFDM symbol, so that time domain resource utilization is improved.

Figure 16:
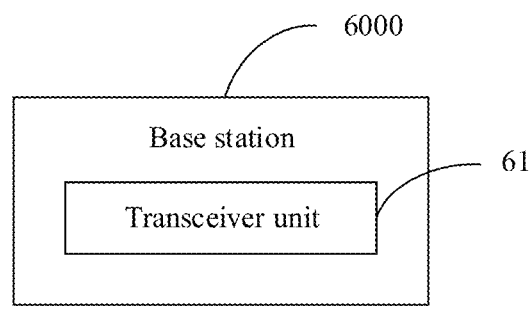
FIG. 16 is a schematic diagram of a structure of another base station according to an embodiment of this application.

Based on the same concept as the foregoing reference signal resource configuration method, an embodiment of this application further provides a base station. As shown in FIG. 16, the base station 6000 includes a transceiver unit 61.

The transceiver unit 61 is configured to receive capability information reported by a terminal, where the capability information indicates a supported quantity of reference signal resources that can be mapped to a same OFDM symbol.

The transceiver unit 61 is further configured to send reference signal resource configuration information to the terminal, where a quantity of reference signal resources indicated by the reference signal resource configuration information does not exceed the capability information.

The transceiver unit 61 is further configured to receive, on the OFDM symbol based on the reference signal resource configuration information, the quantity of the reference signal resources indicated by the reference signal resource configuration information.

For specific implementation of the transceiver unit 16, refer to related descriptions of the base station in the method embodiment shown in FIG. 10.

According to the base station provided in this embodiment of this application, the base station receives a capability, reported by the terminal, of processing a reference signal resource, and the base station appropriately configures a reference signal resource for the terminal based on the capability reported by the terminal, to appropriately configure reference signal resources for multiple purposes. This avoids reference signal resource collision, improves communication reliability, and reduces processing complexity of a terminal chip. In addition, multiple reference signal resources are mapped to a same OFDM symbol, so that time domain resource utilization is improved.

An embodiment of this application further provides a communication apparatus. The communication apparatus may be the foregoing base station or terminal. The communication apparatus is configured to perform the foregoing reference signal resource configuration method. Some or all of the foregoing reference signal resource configuration methods may be implemented by using hardware, or may be implemented by using software.

Optionally, in a specific implementation, the communication apparatus may be a chip or an integrated circuit.

Optionally, when some or all of the reference signal resource configuration methods in the foregoing embodiments are implemented by using software, the communication apparatus includes: a memory, configured to store a program; and a processor, configured to execute the program stored in the memory. When the program is executed, the communication apparatus can separately implement the reference signal resource configuration methods provided by the terminal and the base station in the embodiments shown in FIG. 6, FIG. 7, and FIG. 10.

Optionally, the memory may be a physically independent unit, or may be integrated with a processor. The memory may alternatively be configured to store data.

Optionally, when some or all of the reference signal resource configuration methods in the foregoing embodiments are implemented by using software, the communication apparatus may alternatively include only a processor. A memory configured to store a program is located outside the communication apparatus. The processor is connected to the memory by using a circuit/wire, and is configured to read and execute the program stored in the memory.

The processor may be a central processing unit (central processing unit, CPU), a network processor (network processor, NP), or a combination of the CPU and the NP.

The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable logic gate array (field programmable gate array, FPGA), a generic array logic (generic array logic, GAL), or any combination thereof.

The memory may include a volatile memory (volatile memory), for example, a random access memory (random-access memory, RAM). The memory may alternatively include a non-volatile memory (non-volatile memory), for example, a flash memory (flash memory), a hard disk drive (hard disk drive, HDD), or a solid-state drive (solid-state drive, SSD). The memory may alternatively include a combination of the foregoing types of memories.

It may be understood that units in the foregoing communication apparatus embodiments may also be referred to as modules.

Figure 17:
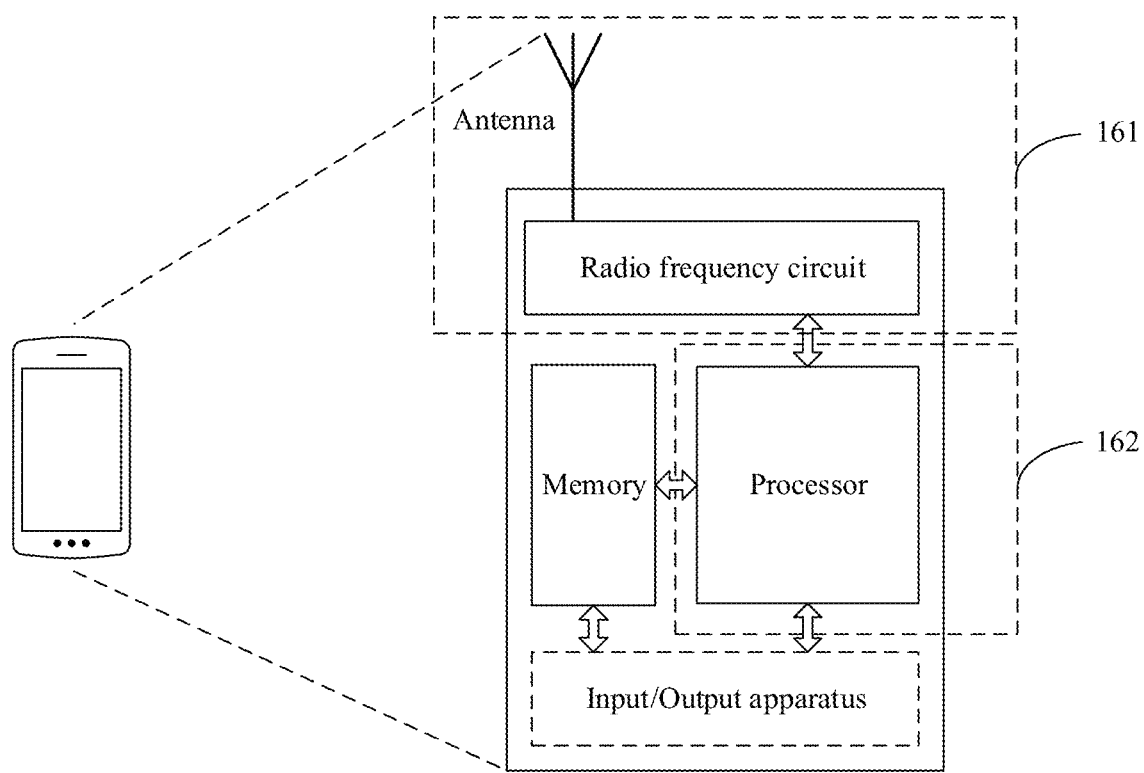
FIG. 17 is a simplified schematic diagram of a structure of another terminal according to an embodiment of this application.

FIG. 17 is a simplified schematic diagram of a structure of a terminal. For ease of understanding and illustration, in FIG. 17, a mobile phone is used as an example of the terminal. As shown in FIG. 17, the terminal includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store a software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, a keyboard, is mainly configured to: receive data by a user and output data to the user. It should be noted that some types of terminals may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 17 shows one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, an antenna having sending and receiving functions and the radio frequency circuit may be considered as a receiving unit and a sending unit (which may also be collectively referred to as a transceiver unit) of the terminal, and a processor having a processing function may be considered as a processing unit of the terminal. As shown in FIG. 17, the terminal includes a transceiver unit 161 and a processing unit 162. The transceiver unit 161 may alternatively be referred to as a receiver/transmitter (sender), a receiver/transmitter machine, a receiver/transmitter circuit, or the like. The processing unit 162 may alternatively be referred to as a processor, a processing board, a processing module, a processing apparatus, or the like.

For example, in an embodiment, the transceiver unit 161 is configured to perform the actions of the terminal in steps S101 and S103 in the embodiment shown in FIG. 6, and the processing unit 162 is configured to perform step S102 in the embodiment shown in FIG. 6.

For example, in another embodiment, the transceiver unit 161 is configured to perform the actions of the terminal in steps S201 and S203 in the embodiment shown in FIG. 7, and the processing unit 162 is configured to perform step S202 in the embodiment shown in FIG. 7.

For example, in another embodiment, the transceiver unit 161 is configured to perform the actions of the terminal in steps S301, S302, and S304 in the embodiment shown in FIG. 10, and the processing unit 162 is configured to perform step S303 in the embodiment shown in FIG. 10.

Figure 18:
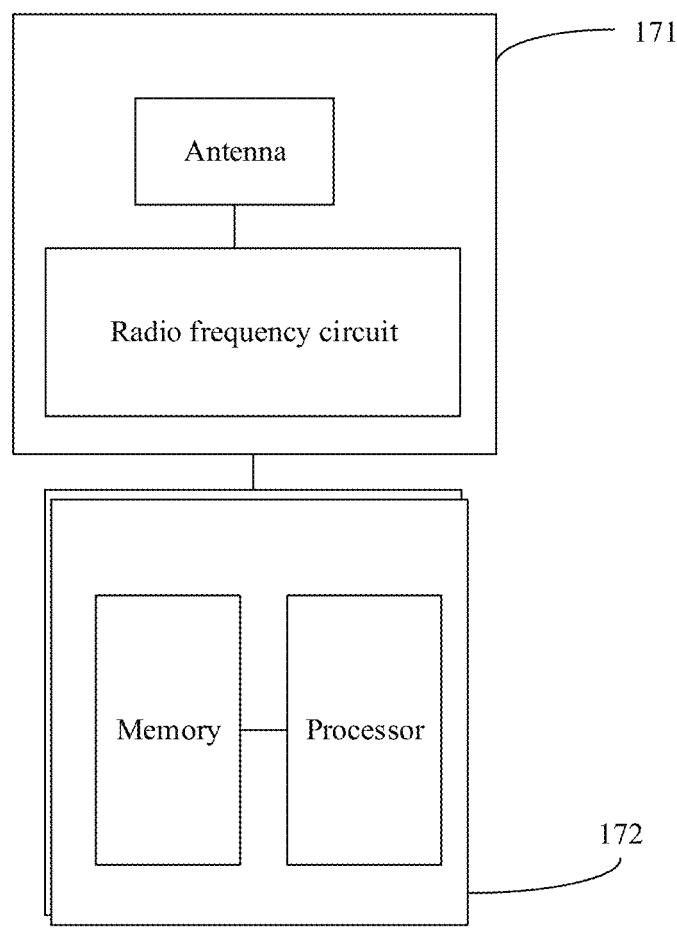
FIG. 18 is a simplified schematic diagram of a structure of another base station according to an embodiment of this application.

FIG. 18 is a simplified schematic diagram of a structure of a base station. The base station includes a part 172 and a part for radio frequency signal transmission/reception and conversion, and the part for radio frequency signal transmission/reception and conversion further includes a transceiver unit 171. The part for radio frequency signal receiving/sending and conversion is mainly configured to: send/receive a radio frequency signal and perform conversion between a radio frequency signal and a baseband signal. The part 172 is mainly configured to perform baseband processing, control the base station, and the like. The transceiver unit 171 may alternatively be referred to as a receiver/transmitter (sender), a receiver/transmitter machine, a receiver/transmitter circuit, or the like. The part 172 is usually a control center of the base station, may be usually referred to as a processing unit, and is configured to control a source base station to perform the steps performed by the base station in FIG. 6, FIG. 7, and FIG. 10.

The part 172 may include one or more boards. Each board may include one or more processors and one or more memories. The processor is configured to read and execute a program in the memory to implement a baseband processing function and control the base station. If there are multiple boards, the boards may be interconnected to improve a processing capability. In an optional implementation, multiple boards may share one or more processors, multiple boards share one or more memories, or multiple boards simultaneously share one or more processors.

For example, in an embodiment, the transceiver unit 171 is configured to perform the actions of the base station in steps S101 and S103 in the embodiment shown in FIG. 6.

For example, in another embodiment, the transceiver unit 171 is configured to perform the actions of the base station in steps S201 and S203 in the embodiment shown in FIG. 7.

For example, in another embodiment, the transceiver unit 171 is configured to perform the actions of the base station in steps S301, S302, and S304 in the embodiment shown in FIG. 10.

An embodiment of this application further provides a computer-readable storage medium. The computer-readable storage medium stores a computer program or instructions. When the computer program or the instructions are executed, the methods according to the foregoing aspects are implemented.

An embodiment of this application further provides a computer program product including instructions. When the instructions are run on a computer, the computer is enabled to perform the methods according to the foregoing aspects.

An embodiment of this application further provides a communication system, including the foregoing base station and terminal.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, division into the units is merely logical function division and may be another division in actual implementation. For example, multiple units or components may be combined or integrated into another system, or some features may be ignored or not performed. The displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, in other words, may be located in one position, or may be distributed on multiple network units. Some or all of the units may be selected based on actual requirements to achieve the objectives of the solutions of embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (read-only memory, ROM), a random access memory (random access memory, RAM), or a magnetic medium, for example, a floppy disk, a hard disk, a magnetic tape, a magnetic disk, or an optical medium, for example, a digital versatile disc (digital versatile disc, DVD), or a semiconductor medium, for example, a solid state drive (solid state disk, SSD).

What is claimed is:

1. A sounding reference signal (SRS) resource configuration method, comprising:
   receiving, by a terminal, SRS resource configuration information from a base station; and
   in response to determining that at least two SRS resources indicated by the SRS resource configuration information are located on a same orthogonal frequency division multiplexing (OFDM) symbol, mapping, by the terminal, one of the at least two SRS resources to the OFDM symbol, wherein the at least two SRS resources include at least one SRS resource configured by the base station for positioning.

2. The method according to claim 1, wherein:
   a first SRS resource of the at least two SRS resources is used for a first purpose, and a second SRS resource of the at least two SRS resources is used for a second purpose; or
   the at least two SRS resources are all used for a second purpose, and the terminal maps, to the OFDM symbol, one of the at least two SRS resources used for the second purpose; and
   wherein the first purpose comprises any one of beam management, antenna switching, codebook transmission, and non-codebook transmission, and the second purpose comprises positioning.

3. The method according to claim 1, wherein
   when the SRS resource used for positioning and the SRS resource used for another purpose have a same time domain behavior, mapping, to the OFDM symbol, only the SRS resource used for another purpose; or
   when the SRS resource used for positioning and the SRS resource used for another purpose have a same time domain behavior, mapping, to the OFDM symbol, only the SRS resource used for positioning; or
   when the SRS resource used for positioning and the SRS resource used for another purpose have different time domain behaviors, mapping a SRS resource with a higher time domain behavior to the OFDM symbol.

4. The method according to claim 1, wherein a quantity of SRS resources indicated by the SRS resource configuration information does not exceed capability information of the terminal.

5. A sounding reference signal (SRS) resource configuration method, comprising:
   sending, by a base station, SRS resource configuration information to a terminal, wherein at least two SRS resources indicated by the SRS resource configuration information are located on a same orthogonal frequency division multiplexing (OFDM) symbol, and the at least two SRS resources include at least one SRS resource configured by the base station for positioning; and
   receiving, by the base station, one of the at least two SRS resources sent by the terminal on the OFDM symbol.

6. The method according to claim 5, wherein:
   a first SRS resource of the at least two SRS resources is used for a first purpose, and a second SRS resource of the at least two SRS resources is used for a second purpose; or
   the at least two SRS resources are all used for a second purpose, and the terminal maps, to the OFDM symbol, one of the at least two SRS resources used for the second purpose; and wherein the first purpose comprises any one of beam management, antenna switching, codebook transmission, and non-codebook transmission, and the second purpose comprises positioning.

7. The method according to claim 5, wherein
   when the SRS resource used for positioning and the SRS resource used for another purpose have a same time domain behavior, mapping, to the OFDM symbol, only the SRS resource used for another purpose; or
   when the SRS resource used for positioning and the SRS resource used for another purpose have a same time domain behavior, mapping, to the OFDM symbol, only the SRS resource used for positioning; or
   when the SRS resource used for positioning and the SRS resource used for another purpose have different time domain behaviors, mapping a SRS resource with a higher time domain behavior to the OFDM symbol.

8. The method according to claim 5, wherein a quantity of SRS resources indicated by the SRS resource configuration information does not exceed capability information of the terminal.

9. A terminal, comprising:
   a transceiver, the transceiver configured to receive sounding reference signal (SRS) resource configuration information from a base station;
   at least one processor; and
   one or more memories coupled to the at least one processor and storing programming instructions for execution by the at least one processor to: in response to determining that at least two SRS resources indicated by the SRS resource configuration information are located on a same orthogonal frequency division multiplexing (OFDM) symbol, map one of the at least two SRS resources to the OFDM symbol, wherein the at least two SRS resources include at least one SRS resource configured by the base station for positioning.

10. The terminal according to claim 9, wherein:
    a first SRS resource of the at least two SRS resources is used for a first purpose, and a second SRS resource of the at least two SRS resources is used for a second purpose; or
    the at least two SRS resources are all used for a second purpose, and the terminal maps, to the OFDM symbol, one of the at least two SRS resources used for the second purpose; and
    wherein the first purpose comprises any one of beam management, antenna switching, codebook transmission, and non-codebook transmission, and the second purpose comprises positioning.

11. The terminal according to claim 9, wherein the programming instructions for execution by the at least one processor to:
    when the SRS resource used for positioning and the SRS resource used for another purpose have a same time domain behavior, map, to the OFDM symbol, only the SRS resource used for another purpose; or
    when the SRS resource used for positioning and the SRS resource used for another purpose have a same time domain behavior, mapping, to the OFDM symbol, only the SRS resource used for positioning; or
    when the SRS resource used for positioning and the SRS resource used for another purpose have different time domain behaviors, mapping a SRS resource with a higher time domain behavior to the OFDM symbol.

12. The terminal according to claim 9, wherein a quantity of SRS resources indicated by the SRS resource configuration information does not exceed capability information of the terminal.

13. The base station according to claim 9, wherein the programming instructions for execution by the at least one processor to:
when the SRS resource used for positioning and the SRS resource used for another purpose have a same time domain behavior, map, to the OFDM symbol, only the SRS resource used for another purpose; or
when the SRS resource used for positioning and the SRS resource used for another purpose have a same time domain behavior, mapping, to the OFDM symbol, only the SRS resource used for positioning; or
when the SRS resource used for positioning and the SRS resource used for another purpose have different time domain behaviors, mapping a SRS resource with a higher time domain behavior to the OFDM symbol.

14. A base station, comprising:
a transceiver;
at least one processor; and
one or more memories coupled to the at least one processor and storing programming instructions for execution by the at least one processor to cause the transceiver to:
send sounding reference signal (SRS) resource configuration information to a terminal, wherein at least two SRS resources indicated by the SRS resource configuration information are located on a same orthogonal frequency division multiplexing (OFDM) symbol, and the at least two SRS resources include at least one SRS resource configured by the base station for positioning; and
receive one of the at least two SRS resources sent by the terminal on the OFDM symbol.

15. The base station according to claim 14, wherein:
a first SRS resource of the at least two SRS resources is used for a first purpose, and a second SRS resource of the at least two SRS resources is used for a second purpose; or
the at least two SRS resources are all used for a second purpose, and the terminal maps, to the OFDM symbol, one of the at least two SRS resources used for the second purpose; and
wherein the first purpose comprises any one of beam management, antenna switching, codebook transmission, and non-codebook transmission, and the second purpose comprises positioning.

16. The base station according to claim 14, wherein a quantity of SRS resources indicated by the SRS resource configuration information does not exceed capability information of the terminal.

* * * * *